(12) United States Patent
Kibbey et al.

(10) Patent No.: US 10,699,240 B2
(45) Date of Patent: Jun. 30, 2020

(54) HYBRID DELIVERY PLATFORM FOR REGULATED PRODUCTS

(71) Applicant: Eaze Technologies, Inc., San Francisco, CA (US)

(72) Inventors: Joshua Kibbey, El Granada, CA (US); Stratos Christianakis, Sausalito, CA (US); Eli Woods, Piedmont, CA (US); Andrew Tilley, Oakland, CA (US); Daniel Erickson, Oakland, CA (US); Edmond Meinfelder, San Francisco, CA (US); Potluck Mittal, San Francisco, CA (US)

(73) Assignee: EAZE TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 16/582,164

(22) Filed: Sep. 25, 2019

(65) Prior Publication Data

US 2020/0097900 A1    Mar. 26, 2020

Related U.S. Application Data

(60) Provisional application No. 62/736,316, filed on Sep. 25, 2018.

(51) Int. Cl.
*G06Q 10/08* (2012.01)
*G06F 16/21* (2019.01)
(Continued)

(52) U.S. Cl.
CPC ....... *G06Q 10/0832* (2013.01); *G06F 16/212* (2019.01); *G06N 5/04* (2013.01);
(Continued)

(58) Field of Classification Search
CPC ......... G06Q 10/0832; G06Q 10/08345; G06Q 10/08355; G06F 16/212; G06F 3/0685;
(Continued)

(56) References Cited

U.S. PATENT DOCUMENTS 7,308,423 B1    12/2007   Woodward et al.
8,121,878 B2 *   2/2012   Tanaka ................... G06Q 10/00
                                                             705/7.11
(Continued)

FOREIGN PATENT DOCUMENTS

WO    WO-2019232314 A1    12/2019

OTHER PUBLICATIONS

Benjamin Baran and Matilde Schaerer "A multiobjective Ant Colony System for Vehicle Routing Problem With Time Windows," Centro Nacional de Computacion, Universidad Nacional de Asuncion p. 98 Section 3 (Year: 2003).*

*Primary Examiner* — George Chen
*Assistant Examiner* — Brian Adams Heflin
(74) *Attorney, Agent, or Firm* — Wilson Sonsini Goodrich & Rosati

(57) ABSTRACT

Disclosed herein are computer-implemented systems comprising: a digital processing device and a computer program to create a hybrid delivery model application for regulated products comprising: a database of at least one delivery territory; product depot; regulated products; and delivery vehicles, each vehicle comprising a regulated product inventory case and configured to operate in either of a dynamic delivery model and a batch delivery model and optionally switch between models; a software module setting the delivery model for each vehicle and optionally switching the delivery model for one or more of the vehicles; a software module providing the dynamic delivery model, and a software module providing the batch delivery model, wherein a (Continued)

content of the inventory case is determined based at least on a predicted demand and the upper inventory case value threshold.

30 Claims, 31 Drawing Sheets

(51) Int. Cl.
*G06N 5/04* (2006.01)
*G06N 20/00* (2019.01)

(52) U.S. Cl.
CPC ....... *G06N 20/00* (2019.01); *G06Q 10/08345* (2013.01); *G06Q 10/08355* (2013.01)

(58) Field of Classification Search
CPC .... G06F 16/29; G06F 16/482; G06F 16/4387; G06F 16/955; G06N 20/00; H04W 24/02; H04W 4/46; H04N 19/105; H04L 47/822

See application file for complete search history.

(56) References Cited

U.S. PATENT DOCUMENTS

| | | | |
|---|---|---|---|
| 8,560,461 B1 * | 10/2013 | Tian | G06Q 10/087 705/332 |
| 2003/0132249 A1 | 7/2003 | Romano | |
| 2003/0200111 A1 * | 10/2003 | Damji | G06Q 10/08 705/335 |
| 2007/0055580 A1 | 3/2007 | Woodward et al. | |
| 2011/0258074 A1 | 10/2011 | Woodward et al. | |
| 2019/0197544 A1 * | 6/2019 | Frost | G06Q 20/4014 |

* cited by examiner

Fig. 4 eaze    01/27/2018    1/2

5489      John S.
ORDER NUMBER      CUSTOMER

VAPORIZER

| ☐ 2X | Active Balance<br>ID# 98741 | STATE |
|---|---|---|
| ☐ 2X | Active Balance<br>ID# 98741 | STATE |

VAPORIZER

| ☐ 2X | Active Balance<br>ID# 98741 | STATE |
|---|---|---|
| ☐ 2X | Active Balance<br>ID# 98741 | STATE |

Fig. 5

Manesh G.     3
DRIVER     ORDERS

1. 5489    6    Jeffrey E.    3116 Adeline st.
ORDER NUMBER   ITEMS   CUSTOMER   OAKLAND, CA 94608

2. 5491    2    James P.    1658 40th Ave
ORDER NUMBER   ITEMS   CUSTOMER   OAKLAND, CA 94608

3. 5492    2    Scott B.    154 Martin Luther King blvd
ORDER NUMBER   ITEMS   CUSTOMER   OAKLAND, CA 94608

HYBRID DELIVERY PLATFORM FOR REGULATED PRODUCTS

CROSS-REFERENCE

This application claims the benefit of U.S. Provisional Application No. 62/736,316, filed Sep. 25, 2018, which application is incorporated herein by reference.

BACKGROUND OF THE INVENTION

Delivery is a process of transporting goods from a first location (e.g., a depot or warehouse) to a second location (e.g., predetermined location of a consumer). With technological advances, service providers may leverage technologies such as the Internet to facilitate displaying goods to their potential consumers and the transporting of the same.

SUMMARY OF THE INVENTION

Unlike the delivery of regular, unregulated products, the delivery of regulated products (e.g., marijuana or marijuana-related products) face unique regulatory hurdles. To meet optimal estimated time of arrivals (ETAs) for orders of regulated products, an order may be optimally fulfilled from the inventory within a vehicle, rather than the vehicle having to travel back to a depot to complete an order. However, some regulations in some jurisdictions impose specific value restrictions on how much inventory of the regulated products a delivery driver can carry in his vehicle. In many instances, these specific value restrictions mean limited inventory within the vehicle. In turn, this may mean that the vehicle would have to travel back to the depot to complete an order, resulting in longer ETAs than if the vehicle carried the regulated products without limit in the first place and completed the order from the inventory in the vehicle. In other jurisdictions, there are time constraints on when certain regulated products can be delivered and received by a consumer. In other situations, there are rules related to publishing a manifest of the exact kinds of regulated product to be delivered, along with rules related to verification of the individual receiving the delivery (e.g., age verification). The regulations that impact these regulated products are often constantly changing and evolving. Accordingly, a technological tool to optimize case packing of these regulated products in light of the regulations (e.g., upper inventory case value) is needed.

As orders of regulated products may be fulfilled using inventory within a vehicle, the unique challenges associated with the delivery of regulated products are further compounded when considering the logistics of fulfilling orders from the limited inventory contained within a particular vehicle. When a selected combination of regulated products cannot be provided by a single driver and his inventory in his car, this may cause a significant amount of checkout errors when a consumer attempts to make his purchase. Furthermore, to the extent traditional delivery models of regulated products exist, these traditional methods do not provide different and targeted delivery models based on predicted consumer demand, the specific regulations (e.g., the upper inventory case value threshold), and the estimated time of arrival (ETA). Accordingly, a technological tool to improve on existing delivery models while accounting for the unique challenges in the regulated product space within the vehicle is needed.

The systems and methods herein advantageously provide a hybrid delivery model that takes into consideration the specific regulations or rules for delivery of regulated products. In addition, the systems and methods herein also advantageously use machine learning algorithms to predict consumer demand, determine the case inventory of a delivery vehicle, and/or determine the location of a driver. In some embodiments, the machine learning tools give computer systems the ability to learn (e.g., progressively improve performance on specific tasks with data) without being explicitly programmed, thereby providing an improvement to a technical field and the underlying computer technology. For example, in some embodiments, the systems and methods use machine learning and/or other mathematical techniques to determine the least expensive matching between delivery orders and drivers who can fulfill these orders. In some embodiments, the least expensive matching refers to financial cost, e.g., driver mileage and time, and also customer experience cost due to longer delivery times and less accurate estimated time of arrivals. Other advantages of the systems and methods here include significantly reduced checkout errors, and the ability to automatically switch between different delivery models for each delivery vehicle based on the predicted demand or the case inventory. Yet another advantage of the systems and methods is the increase in average order value with the provision of hybrid delivery model herein when compared with traditional delivery models. Yet still another advantage is that the systems and methods herein are configured to approximate the optimal combinatorial solution to packing mobile inventory while operating under varying compliance guidelines for regulated products.

In some embodiments, the systems and methods herein also provide a technical solution to a technical problem of estimating the optimal inventory case(s) for drivers delivering regulated products using hybrid and/or dynamic modes in order to minimize checkout errors while operating under varying compliance guidelines. In some embodiments, the systems and methods herein provide a technical solution to the technical problem of generating an optimal batch for a batch driver in order to best meet the expected delivery time desired by customers. In turn, in some aspects, the systems and methods herein provide a mechanism of how to deliver more regulated products to the customers quickly, efficiently, and conveniently given various regulatory guidance in different delivery territories.

In one aspect, disclosed herein is a computer-implemented system comprising: a digital processing device comprising: at least one processor, an operating system configured to perform executable instructions, a memory, and a computer program including instructions executable by the at least one processor to create a hybrid delivery model application for regulated products comprising: a database comprising: at least one delivery territory; a plurality of regulated products; and a plurality of delivery vehicles, each vehicle comprising a regulated product inventory case; the regulated products subject to regulation imposing an upper regulated inventory case value threshold; and each vehicle configured to operate in either of a dynamic delivery model and a batch delivery model and optionally switch between models; a software module setting the delivery model for each vehicle and optionally switching the delivery model for one or more of the vehicles; a software module receiving orders for delivery of one or more of the regulated products within the at least one delivery territory; a software module providing the dynamic delivery model, wherein a content of the inventory case is determined based at least on a predicted demand and the upper regulated inventory case value threshold, and wherein one or more of the received orders are assigned, based at least on routing efficiency comprising distance and estimated delivery time, as they are received by one or more vehicles operating in the dynamic delivery model; and a software module providing the batch delivery model, wherein a content of the inventory case is determined based at least on a plurality of the received orders and the upper regulated inventory case value threshold, and wherein the plurality of the received orders are batched, based at least on routing efficiency comprising distance and estimated delivery time, and assigned to a vehicle operating in the batch delivery model. In some embodiments, the application further comprises a software module providing an interface allowing an administrative user to configure the application to favor either the dynamic delivery model or the batch delivery model. In some embodiments, the favoring is based at least on a configurable weighting factor or a configurable percentage of deliveries. In some embodiments, the dynamic delivery model is favored and applied if possible based on the content of the inventory cases of the vehicles operating in the dynamic delivery model. In some embodiments, the application further comprises a software module providing an interface allowing an administrative user to manually switch the delivery model of one or more of the vehicles. In some embodiments, the upper regulated inventory case value threshold is less than $10,000, less than $5,000, or less than $3,000. In some embodiments, the application further comprises a software module providing an interface allowing an administrative user to configure the upper regulated inventory case value threshold. In some embodiments, in the batch delivery model, the application generates a manifest for the regulated products in the plurality of the received orders. In some embodiments, the database further comprises a plurality of unregulated products and wherein the content of the inventory case comprises one or more of the unregulated products, one or more of the regulated products, or a combination thereof. In some embodiments, an upper total inventory case value threshold is less than $20,000, less than $10,000, less than $5,000, or less than $3,000. In some embodiments, the application further comprises a software module providing an interface allowing an administrative user to configure the upper total inventory case value threshold. In some embodiments, the application further comprises a software module providing an interface allowing an administrative user to configure the at least one delivery territory. In some embodiments, the application further comprises a software module setting the delivery model for the at least one delivery territory, at least one depot, or both, wherein the at least one depot is for storing products to be delivered. In some embodiments, the application further comprises a software module providing an interface allowing an administrative user to manually switch the delivery model of the at least one delivery territory, the at least one depot, or both. In some embodiments, the case inventory is determined by a machine learning algorithm. In some embodiments, the demand is predicted by a machine learning algorithm. In some embodiments, the application operates with less than 5%, less than 4%, or less than 3% checkout errors for the received orders. In some embodiments, the software module providing the batch delivery model is configured to determine at least one batch for a batch driver comprising: calculating a batch size based on one or more of: a number of available drivers, proximity of an available driver to a depot, location of orders, and a count of orders; determining a maximum or minimum batch size; determining an anchor order with high delivery priority; and grouping one or more orders with the anchor order. In some embodiments, each of the one or more orders are grouped based on a distance between a delivery address of that order to the delivery address of the batch order, delivery time from the delivery address of that order to the delivery address of the batch order, or both.

In another aspect, disclosed herein is a non-transitory computer-readable storage media encoded with a computer program including instructions executable by a processor to create a hybrid delivery model application for regulated products comprising: a database comprising: at least one delivery territory; a plurality of regulated products; and a plurality of delivery vehicles, each vehicle comprising a regulated product inventory case; the regulated products subject to regulation imposing an upper regulated inventory case value threshold; and each vehicle configured to operate in either of a dynamic delivery model and a batch delivery model and optionally switch between models; a software module setting the delivery model for each vehicle and optionally switching the delivery model for one or more of the vehicles; a software module receiving orders for delivery of one or more of the regulated products within the at least one delivery territory; a software module providing the dynamic delivery model, wherein a content of the inventory case is determined based at least on a predicted demand and the upper regulated inventory case value threshold, and wherein one or more of the received orders are assigned, based at least on routing efficiency comprising distance and estimated delivery time, as they are received to one or more vehicles operating in the dynamic delivery model; and a software module providing the batch delivery model, wherein a content of the inventory case is determined based at least on a plurality of the received orders and the upper regulated inventory case value threshold, and wherein the plurality of the received orders are batched, based at least on routing efficiency comprising distance and estimated delivery time, and assigned to a vehicle operating in the batch delivery model. In some embodiments, the application further comprises a software module providing an interface allowing an administrative user to configure the application to favor the dynamic delivery model or the batch delivery model. In some embodiments, the favoring is based at least on a configurable weighting factor or a configurable percentage of deliveries. In some embodiments, the dynamic delivery model is favored and applied if possible based on the content of the inventory cases of the vehicles operating in the dynamic delivery model. In some embodiments, the application further comprises a software module providing an interface allowing an administrative user to manually switch the delivery model of one or more of the vehicles. In some embodiments, the upper regulated inventory case value threshold is less than $10,000, less than $5,000, or less than $3,000. In some embodiments, the application further comprises a software module providing an interface allowing an administrative user to configure the upper regulated inventory case value threshold. In some embodiments, in the batch delivery model, the application generates a manifest for the regulated products in the plurality of the received orders. In some embodiments, the database further comprises a plurality of unregulated products and wherein the content of the inventory case comprises one or more of the unregulated products, one or more of the regulated products, or a combination thereof. In some embodiments, an upper total inventory case value threshold is less than $20,000, less than $10,000, less than $5,000, or less than $3,000. In some embodiments, the application further comprises a software module providing an interface allowing an administrative user to configure the upper total inventory case value threshold. In some embodiments, the application further comprises a software module providing an interface allowing an administrative user to configure the at least one delivery territory. In some embodiments, the application further comprises a software module setting the delivery model for the at least one delivery territory, at least one depot, or both, wherein the at least one depot is for storing products to be delivered. In some embodiments, the application further comprises a software module providing an interface allowing an administrative user to manually switch the delivery model of the at least one delivery territory, the at least one depot, or both. In some embodiments, the case inventory is determined by a machine learning algorithm. In some embodiments, the demand is predicted by a machine learning algorithm. In some embodiments, the application operates with less than 5%, less than 4%, or less than 3% checkout errors for the received orders. In some embodiments, the software module providing the batch delivery model is configured to determine at least one batch for a batch driver comprising: calculating a batch size based at least on information of a driver's supply or a count of orders; determining a maximum or minimum batch size; determining an anchor order with high delivery priority; and grouping one or more orders with the anchor order. In some embodiments, each of the one or more orders are grouped based on a distance between a delivery address of that order to the delivery address of the batch order, delivery time from the delivery address of that order to the delivery address of the batch order, or both.

In yet another aspect, disclosed herein is a computer-implemented method of delivering regulated products via a hybrid delivery model system comprising: maintaining, in a non-transitory storage, a database comprising: at least one delivery territory; a plurality of regulated products; and a plurality of delivery vehicles, each vehicle comprising a regulated product inventory case; the regulated products subject to regulation imposing an upper regulated inventory case value threshold; and each vehicle configured to operate in either of a dynamic delivery model and a batch delivery model and optionally switch between models; setting, by a computer, the delivery model for each vehicle and optionally switching the delivery model for one or more of the vehicles; receiving, by the computer, orders for delivery of one or more of the regulated products within the at least one delivery territory; providing, by the computer, the dynamic delivery model, wherein a content of the inventory case is determined based at least on a predicted demand and the upper regulated inventory case value threshold, and wherein one or more of the received orders are assigned, based at least on routing efficiency comprising distance and estimated delivery time, as they are received to one or more vehicles operating in the dynamic delivery model; and providing, by the computer, the batch delivery model, wherein a content of the inventory case is determined based at least on a plurality of the received orders and the upper regulated inventory case value threshold, and wherein the plurality of the received orders are batched, based at least on routing efficiency comprising distance and estimated delivery time, and assigned to a vehicle operating in the batch delivery model. In some embodiments, the method further comprises providing, by the computer, an interface allowing an administrative user to configure the application to favor the dynamic delivery model or the batch delivery model. In some embodiments, the favoring is based at least on a configurable weighting factor or a configurable percentage of deliveries. In some embodiments, the dynamic delivery model is favored and applied if possible based on the content of the inventory cases of the vehicles operating in the dynamic delivery model. In some embodiments, the method further comprises providing, by the computer, an interface allowing an administrative user to manually switch the delivery model of one or more of the vehicles. In some embodiments, the method further comprises switching, by the computer, the delivery model of one or more of the vehicles automatically. In some embodiments, the upper regulated inventory case value threshold is less than $10,000, less than $5,000, or less than $3,000. In some embodiments, the method further comprises providing, by the computer, an interface allowing an administrative user to configure the upper regulated inventory case value threshold. In some embodiments, the method further comprises configuring, by the computer, the upper regulated inventory case value threshold automatically. In some embodiments, in the batch delivery model, a manifest is generated for the regulated products in the plurality of the received orders. In some embodiments, the database further comprises a plurality of unregulated products and wherein the content of the inventory case comprises one or more of the unregulated products, one or more of the regulated products, or a combination thereof. In some embodiments, an upper total inventory case value threshold is less than $20,000, less than $10,000, less than $5,000, or less than $3,000. In some embodiments, the method further comprises providing, by the computer, an interface allowing an administrative user to configure the upper total inventory case value threshold. In some embodiments, the method further comprises configuring, by the computer, the upper total inventory case value threshold automatically. In some embodiments, the method further comprises providing, by the computer, an interface allowing an administrative user to configure the at least one delivery territory. In some embodiments, the method further comprises setting, by the computer, the delivery model for the at least one delivery territory, at least one depot, or both, wherein the at least one depot is for storing products to be delivered. In some embodiments, the method further comprises providing, by the computer, an interface allowing an administrative user to manually switch the delivery model of the at least one delivery territory, the at least one depot, or both. In some embodiments, the case inventory is determined by a machine learning algorithm. In some embodiments, the demand is predicted by a machine learning algorithm. In some embodiments, the method is with less than 5%, less than 4%, or less than 3% checkout errors for the received orders. In some embodiments, providing the batch delivery model comprises determining at least one batch for a batch driver comprising: calculating a batch size based on one or more of: a number of available drivers, proximity of an available driver to a depot, location of orders, and a count of orders; determining a maximum or minimum batch size; determining an anchor order with high delivery priority; and grouping one or more orders with the anchor order. In some embodiments, each of the one or more orders are grouped based on a distance between a delivery address of that order to the delivery address of the batch order, delivery time from the delivery address of that order to the delivery address of the batch order, or both.

In still yet another aspect, disclosed herein is a computer-implemented system comprising: a digital processing device comprising: at least one processor, an operating system configured to perform executable instructions, a memory, and a computer program including instructions executable by the at least one processor to create mobile inventory case packing application for a dynamic or hybrid delivery model, the application comprising: a database of regulated and unregulated products, the regulated products subject to an upper regulated inventory case value; a software module receiving the upper regulated inventory case value, a base case allotment, and a number of cases; a software module conducting a data collection stage by performing at least the following: building a set of training data comprising historical demand and orders; generating a ranked list of products based on demand; and determining an upper case quantity bound and a lower case quantity bound for each product based on demand; and a software module conducting a parallelized simulation stage by performing at least the following: generating one or more simulated cases based on the number of cases and the base case allotment by: for each case, filling a base case up to either the base case allotment or up to the lower bound of each regulated product by sequentially traversing the ranked list, and if room is left in the base case, selecting random regulated products from the ranked list with exponential weighting applied to the rank; and for each case, until a total case quantity is at the upper bound, first, randomly selecting a remaining regulated product based on exponential weighting and adding it to a random case; and second, selecting an unregulated product and adding it to all cases; running a plurality of parallel simulations based on the set of training data; and evaluating a performance of each simulated case. In some embodiments, a software module conducting a data collection stage further performs generating an affinity matrix comprising a set of weights representing relationships between products. In some embodiments, a software module conducting a parallelized simulation stage further performs, prior to selecting an unregulated product, randomly selecting a remining regulated product and adding it to a case based on the affinity matrix. In some embodiments, the number of cases is received from a machine learning process. In some embodiments, the base case allotment is received from a machine learning process. In some embodiments, higher demand products have higher relative case quantity bounds and lower demand products have lower relative case quantity bounds. In some embodiments, the ranked list of products is determined based on at least the percentage a product contributes to revenue, the probability the product is added to a customer's cart, and an average size of order in which the product appears. In some embodiments, the ranked list of products is determined by a machine learning process. In some embodiments, the upper and the lower case quantity bound for each product is determined by a machine learning process. In some embodiments, the affinity matrix is generated by a machine learning process. In some embodiments, the base case allotment represents a predetermined percentage of the upper regulated inventory case value. In some embodiments, the software module conducting the parallelized simulation stage further returns one or more of the top performing simulated cases. In some embodiments, a software module conducting a data collection stage by further performing: collecting driver's data comprising: a number of shifts for one or more days, a number of drivers per shift, or both.

In still yet another aspect, disclosed herein is a computer-implemented system comprising: a digital processing device comprising: at least one processor, an operating system configured to perform executable instructions, a memory, and a computer program including instructions executable by the at least one processor to create mobile inventory case packing application for a dynamic or hybrid delivery model, the application comprising: a database of regulated and unregulated products, the regulated products subject to an upper regulated inventory case value; a software module receiving the upper regulated inventory case value, and a base case allotment; a software module conducting a data collection stage by performing at least the following: building a set of training data comprising historical demand and orders; generating a ranked list of products based on demand; determining an upper case quantity bound and a lower case quantity bound for each product based on demand; and a software module conducting a parallelized simulation stage by performing at least the following: generating a simulated case based on the base case allotment by: filling a base case up to the base case allotment by sequentially traversing the ranked list, and if room is left in the base case, selecting random regulated products from the ranked list with exponential weighting applied to the rank; and until a total case quantity is at the lower bound, randomly selecting an unregulated product and adding it to the case; running a plurality of parallel simulations based on the set of training data; and evaluating a performance of the simulated case. In some embodiments, the number of cases is received from a machine learning process. In some embodiments, the base case allotment is received from a machine learning process. In some embodiments, higher demand products have higher relative case quantity bounds and lower demand products have lower relative case quantity bounds. In some embodiments, the ranked list of products is determined based on at least the percentage a product contributes to revenue, the probability the product is added to a customer's cart, and an average size of order in which the product appears. In some embodiments, the ranked list of products is determined by a machine learning process. In some embodiments, the upper and the lower case quantity bound for each product is determined by a machine learning process. In some embodiments, the base case allotment represents a predetermined percentage of the upper regulated inventory case value. In some embodiments, the software module conducting the parallelized simulation stage further returns one or more of the top performing simulated cases.

In still yet another aspect, disclosed herein is a computer-implemented system comprising: a digital processing device comprising: at least one processor, an operating system configured to perform executable instructions, a memory, and a computer program including instructions executable by the at least one processor to create mobile inventory case packing application for a dynamic or hybrid delivery model, the application comprising: a database of regulated and unregulated products, the regulated products subject to an upper regulated inventory case value; a software module receiving the upper regulated inventory case value, a base case allotment, and a number of cases; a software module conducting a data collection stage by performing at least the following: building a set of training data comprising historical demand and orders; generating a ranked list of products based on demand; determining an upper case quantity bound and a lower case quantity bound for each product based on demand; and if the number of cases is greater than one; and a software module conducting a parallelized simulation stage by performing at least the following: generating one or more simulated cases based on the number of cases and the base case allotment by: if the number of cases is more than one, for each case, filling a base case up to either the base case allotment or up to the lower bound of each regulated product by sequentially traversing the ranked list, and if room is left in the base case, selecting random regulated products from the ranked list with exponential weighting applied to the rank; if the number of cases is one, filling the base case up to either the base case allotment or up to the lower bound of each regulated product by sequentially traversing the ranked list, and if room is left in the base case, selecting random regulated products from the ranked list with exponential weighting applied to the rank to fill the base case; and for each case, until a total case quantity is at the upper bound: if the number of cases is one, randomly selecting an unregulated product and adding it to the case; if the number of cases is more than one, first, randomly selecting with exponential weighting a remaining regulated product and adding it to a random case; and second, selecting an unregulated product and adding it to a random case; running a plurality of parallel simulations based on the set of training data; and evaluating a performance of each simulated case. In some embodiments, a software module conducting a data collection stage further performs generating an affinity matrix comprising a set of weights representing relationships between products. In some embodiments, a software module conducting a parallelized simulation stage further performs, prior to selecting an unregulated product, randomly selecting a remining regulated product and adding it to a case based on the affinity matrix. In some embodiments, the number of cases is received from a machine learning process. In some embodiments, the base case allotment is received from a machine learning process. In some embodiments, higher demand products have higher relative case quantity bounds and lower demand products have lower relative case quantity bounds. In some embodiments, the ranked list of products is determined based on at least the percentage a product contributes to revenue, the probability the product is added to a customer's cart, and an average size of order in which the product appears. In some embodiments, the ranked list of products is determined by a machine learning process. In some embodiments, the upper and the lower case quantity bound for each product is determined by a machine learning process. In some embodiments, the affinity matrix is generated by a machine learning process. In some embodiments, the base case allotment represents a predetermined percentage of the upper regulated inventory case value. In some embodiments, the software module conducting the parallelized simulation stage further returns one or more of the top performing simulated cases. In some embodiments, a software module conducting a data collection stage by further performing: collecting driver's data comprising: a number of shifts for one or more days, a number of drivers per shift, or both.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 4 shows a non-limiting exemplary order sticker with batch delivery model;

FIG. 5 shows a non-limiting exemplary manifest with batch delivery model;

FIGS. 16-17 show non-limiting exemplary graphical user interfaces (GUI) for a user to manage drivers, such as basic information of a driver, delivery model of a driver, and orders that are assigned to the driver;

DETAILED DESCRIPTION OF THE INVENTION

Figure 1:
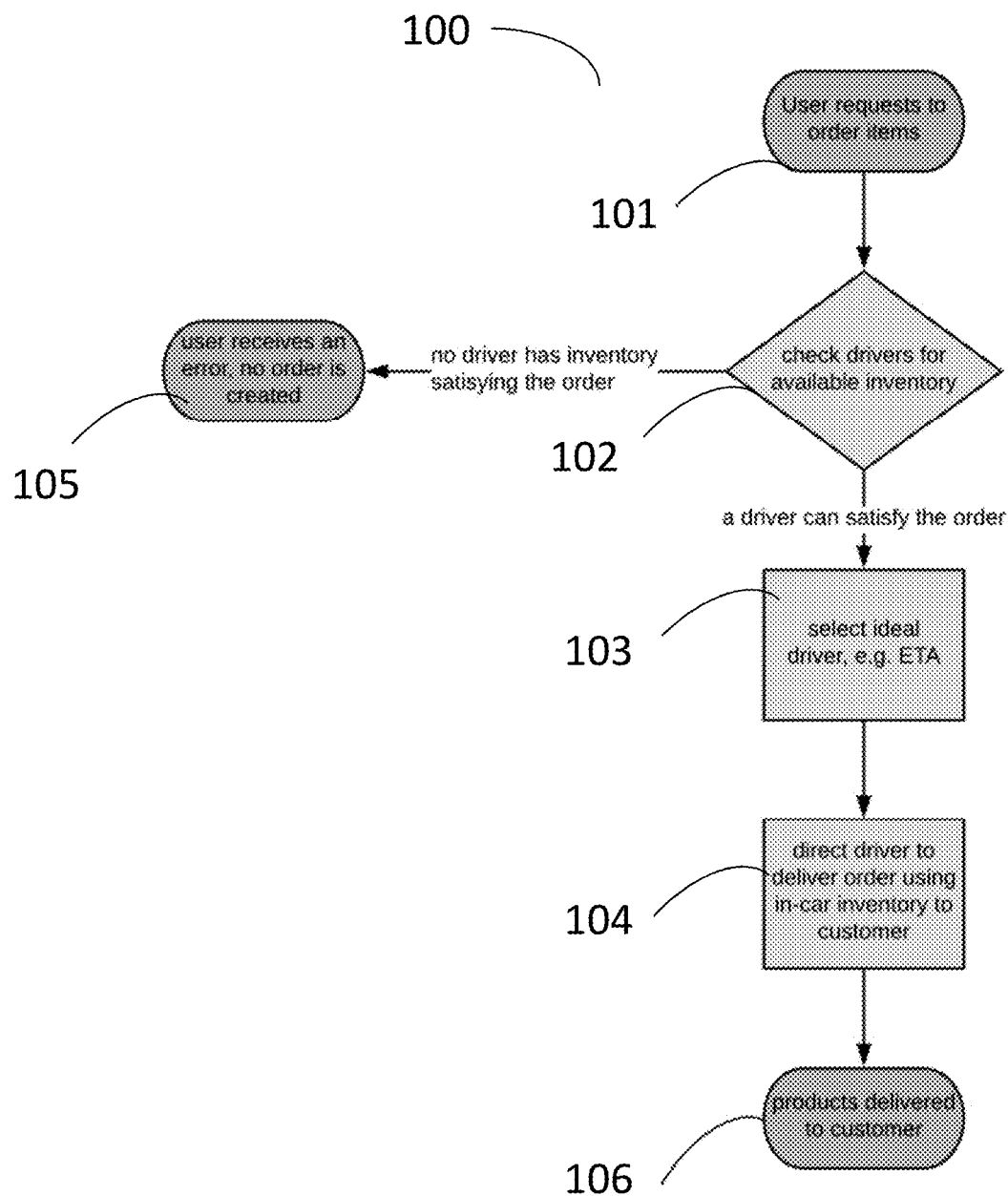
FIG. 1 shows a non-limiting flow chart of the dynamic delivery model disclosed herein.

Disclosed herein, in some embodiments, is a computer-implemented system comprising: a digital processing device comprising: at least one processor, an operating system configured to perform executable instructions, a memory, and a computer program including instructions executable by the at least one processor to create a hybrid delivery model application for regulated products comprising: a database comprising: at least one delivery territory; a plurality of regulated products; and a plurality of delivery vehicles, each vehicle comprising a regulated product inventory case; the regulated products subject to regulation imposing an upper regulated inventory case value threshold; and each vehicle configured to operate in either of a dynamic delivery model and a batch delivery model and optionally switch between models; a software module setting the delivery model for each vehicle and optionally switching the delivery model for one or more of the vehicles; a software module receiving orders for delivery of one or more of the regulated products within the at least one delivery territory; a software module providing the dynamic delivery model, wherein a content of the inventory case is determined based at least on a predicted demand and the upper regulated inventory case value threshold, and wherein one or more of the received orders are assigned, based at least on routing efficiency comprising distance and estimated delivery time, as they are received to one or more vehicles operating in the dynamic delivery model; and a software module providing the batch delivery model, wherein a content of the inventory case is determined based at least on a plurality of the received orders and the upper regulated inventory case value threshold, and wherein the plurality of the received orders are batched, based at least on routing efficiency comprising distance and estimated delivery time, and assigned to a vehicle operating in the batch delivery model. In some embodiments, the application further comprises a software module providing an interface allowing an administrative user to configure the application to favor the dynamic delivery model or the batch delivery model. In some embodiments, the favoring is based at least on a configurable weighting factor or a configurable percentage of deliveries. In some embodiments, the dynamic delivery model is favored and applied if possible based on the content of the inventory cases of the vehicles operating in the dynamic delivery model. In some embodiments, the application further comprises a software module providing an interface allowing an administrative user to manually switch the delivery model of one or more of the vehicles. In some embodiments, the upper regulated inventory case value threshold is less than $10,000, less than $5,000, or less than $3,000. In some embodiments, the application further comprises a software module providing an interface allowing an administrative user to configure the upper regulated inventory case value threshold. In some embodiments, in the batch delivery model, the application generates a manifest for the regulated products in the plurality of the received orders. In some embodiments, the database further comprises a plurality of unregulated products and wherein the content of the inventory case comprises one or more of the unregulated products, one or more of the regulated products, or a combination thereof. In some embodiments, an upper total inventory case value threshold is less than $20,000, less than $10,000, less than $5,000, or less than $3,000. In some embodiments, the application further comprises a software module providing an interface allowing an administrative user to configure the upper total inventory case value threshold. In some embodiments, the application further comprises a software module providing an interface allowing an administrative user to configure the at least one delivery territory. In some embodiments, the application further comprises a software module setting the delivery model for the at least one delivery territory, at least one depot, or both, wherein the at least one depot is for storing products to be delivered. In some embodiments, the application further comprises a software module providing an interface allowing an administrative user to manually switch the delivery model of the at least one delivery territory, the at least one depot, or both. In some embodiments, the case inventory is determined by a machine learning algorithm. In some embodiments, the demand is predicted by a machine learning algorithm. In some embodiments, the application operates with less than 5%, less than 4%, or less than 3% checkout errors for the received orders. In some embodiments, the software module providing the batch delivery model is configured to determine at least one batch for a batch driver comprising: calculating a batch size based on one or more of: a number of available drivers, proximity of an available driver to a depot, location of orders, and a count of orders; determining a maximum or minimum batch size; determining an anchor order with high delivery priority; and grouping one or more orders with the anchor order. In some embodiments, each of the one or more orders are grouped based on a distance between a delivery address of that order to the delivery address of the batch order, delivery time from the delivery address of that order to the delivery address of the batch order, or both.

Disclosed herein, in some embodiments, is a non-transitory computer-readable storage media encoded with a computer program including instructions executable by a processor to create a hybrid delivery model application for regulated products comprising: a database comprising: at least one delivery territory; a plurality of regulated products; and a plurality of delivery vehicles, each vehicle comprising a regulated product inventory case; the regulated products subject to regulation imposing an upper regulated inventory case value threshold; and each vehicle configured to operate in either of a dynamic delivery model and a batch delivery model and optionally switch between models; a software module setting the delivery model for each vehicle and optionally switching the delivery model for one or more of the vehicles; a software module receiving orders for delivery of one or more of the regulated products within the at least one delivery territory; a software module providing the dynamic delivery model, wherein a content of the inventory case is determined based at least on a predicted demand and the upper regulated inventory case value threshold, and wherein one or more of the received orders are assigned, based at least on routing efficiency comprising distance and estimated delivery time, as they are received to one or more vehicles operating in the dynamic delivery model; and a software module providing the batch delivery model, wherein a content of the inventory case is determined based at least on a plurality of the received orders and the upper regulated inventory case value threshold, and wherein the plurality of the received orders are batched, based at least on routing efficiency comprising distance and estimated delivery time, and assigned to a vehicle operating in the batch delivery model. In some embodiments, the application further comprises a software module providing an interface allowing an administrative user to configure the application to favor the dynamic delivery model or the batch delivery model. In some embodiments, the favoring is based at least on a configurable weighting factor or a configurable percentage of deliveries. In some embodiments, the dynamic delivery model is favored and applied if possible based on the content of the inventory cases of the vehicles operating in the dynamic delivery model. In some embodiments, the application further comprises a software module providing an interface allowing an administrative user to manually switch the delivery model of one or more of the vehicles. In some embodiments, the upper regulated inventory case value threshold is less than $10,000, less than $5,000, or less than $3,000. In some embodiments, the application further comprises a software module providing an interface allowing an administrative user to configure the upper regulated inventory case value threshold. In some embodiments, in the batch delivery model, the application generates a manifest for the regulated products in the plurality of the received orders. In some embodiments, the database further comprises a plurality of unregulated products and wherein the content of the inventory case comprises one or more of the unregulated products, one or more of the regulated products, or a combination thereof. In some embodiments, an upper total inventory case value threshold is less than $20,000, less than $10,000, less than $5,000, or less than $3,000. In some embodiments, the application further comprises a software module providing an interface allowing an administrative user to configure the upper total inventory case value threshold. In some embodiments, the application further comprises a software module providing an interface allowing an administrative user to configure the at least one delivery territory. In some embodiments, the application further comprises a software module setting the delivery model for the at least one delivery territory, at least one depot, or both, wherein the at least one depot is for storing products to be delivered. In some embodiments, the application further comprises a software module providing an interface allowing an administrative user to manually switch the delivery model of the at least one delivery territory, the at least one depot, or both. In some embodiments, the case inventory is determined by a machine learning algorithm. In some embodiments, the demand is predicted by a machine learning algorithm. In some embodiments, the application operates with less than 5%, less than 4%, or less than 3% checkout errors for the received orders. In some embodiments, the software module providing the batch delivery model is configured to determine at least one batch for a batch driver comprising: calculating a batch size based at least on information of a driver's supply or a count of orders; determining a maximum or minimum batch size; determining an anchor order with high delivery priority; and grouping one or more orders with the anchor order. In some embodiments, each of the one or more orders are grouped based on a distance between a delivery address of that order to the delivery address of the batch order, delivery time from the delivery address of that order to the delivery address of the batch order, or both.

Disclosed herein, in some embodiments, is a computer-implemented method of delivering regulated products via a hybrid delivery model system comprising: maintaining, in a non-transitory storage, a database comprising: at least one delivery territory; a plurality of regulated products; and a plurality of delivery vehicles, each vehicle comprising a regulated product inventory case; the regulated products subject to regulation imposing an upper regulated inventory case value threshold; and each vehicle configured to operate in either of a dynamic delivery model and a batch delivery model and optionally switch between models; setting, by a computer, the delivery model for each vehicle and optionally switching the delivery model for one or more of the vehicles; receiving, by the computer, orders for delivery of one or more of the regulated products within the at least one delivery territory; providing, by the computer, the dynamic delivery model, wherein a content of the inventory case is determined based at least on a predicted demand and the upper regulated inventory case value threshold, and wherein one or more of the received orders are assigned, based at least on routing efficiency comprising distance and estimated delivery time, as they are received to one or more vehicles operating in the dynamic delivery model; and providing, by the computer, the batch delivery model, wherein a content of the inventory case is determined based at least on a plurality of the received orders and the upper regulated inventory case value threshold, and wherein the plurality of the received orders are batched, based at least on routing efficiency comprising distance and estimated delivery time, and assigned to a vehicle operating in the batch delivery model. In some embodiments, the method further comprises providing, by the computer, an interface allowing an administrative user to configure the application to favor the dynamic delivery model or the batch delivery model. In some embodiments, the favoring is based at least on a configurable weighting factor or a configurable percentage of deliveries. In some embodiments, the dynamic delivery model is favored and applied if possible based on the content of the inventory cases of the vehicles operating in the dynamic delivery model. In some embodiments, the method further comprises providing, by the computer, an interface allowing an administrative user to manually switch the delivery model of one or more of the vehicles. In some embodiments, the method further comprises switching, by the computer, the delivery model of one or more of the vehicles automatically. In some embodiments, the upper regulated inventory case value threshold is less than $10,000, less than $5,000, or less than $3,000. In some embodiments, the method further comprises providing, by the computer, an interface allowing an administrative user to configure the upper regulated inventory case value threshold. In some embodiments, the method further comprises configuring, by the computer, the upper regulated inventory case value threshold automatically. In some embodiments, in the batch delivery model, a manifest is generated for the regulated products in the plurality of the received orders. In some embodiments, the database further comprises a plurality of unregulated products and wherein the content of the inventory case comprises one or more of the unregulated products, one or more of the regulated products, or a combination thereof. In some embodiments, an upper total inventory case value threshold is less than $20,000, less than $10,000, less than $5,000, or less than $3,000. In some embodiments, the method further comprises providing, by the computer, an interface allowing an administrative user to configure the upper total inventory case value threshold. In some embodiments, the method further comprises configuring, by the computer, the upper total inventory case value threshold automatically. In some embodiments, the method further comprises providing, by the computer, an interface allowing an administrative user to configure the at least one delivery territory. In some embodiments, the method further comprises setting, by the computer, the delivery model for the at least one delivery territory, at least one depot, or both, wherein the at least one depot is for storing products to be delivered. In some embodiments, the method further comprises providing, by the computer, an interface allowing an administrative user to manually switch the delivery model of the at least one delivery territory, the at least one depot, or both. In some embodiments, the case inventory is determined by a machine learning algorithm. In some embodiments, the demand is predicted by a machine learning algorithm. In some embodiments, the method is with less than 5%, less than 4%, or less than 3% checkout errors for the received orders. In some embodiments, providing the batch delivery model comprises determining at least one batch for a batch driver comprising: calculating a batch size based on one or more of: a number of available drivers, proximity of an available driver to a depot, location of orders, and a count of orders; determining a maximum or minimum batch size; determining an anchor order with high delivery priority; and grouping one or more orders with the anchor order. In some embodiments, each of the one or more orders are grouped based on a distance between a delivery address of that order to the delivery address of the batch order, delivery time from the delivery address of that order to the delivery address of the batch order, or both.

Disclosed herein, in some embodiments, is a computer-implemented system comprising: a digital processing device comprising: at least one processor, an operating system configured to perform executable instructions, a memory, and a computer program including instructions executable by the at least one processor to create mobile inventory case packing application for a dynamic or hybrid delivery model, the application comprising: a database of regulated and unregulated products, the regulated products subject to an upper regulated inventory case value; a software module receiving the upper regulated inventory case value, a base case allotment, and a number of cases; a software module conducting a data collection stage by performing at least the following: building a set of training data comprising historical demand and orders; generating a ranked list of products based on demand; and determining an upper case quantity bound and a lower case quantity bound for each product based on demand; and a software module conducting a parallelized simulation stage by performing at least the following: generating one or more simulated cases based on the number of cases and the base case allotment by: for each case, filling a base case up to either the base case allotment or up to the lower bound of each regulated product by sequentially traversing the ranked list, and if room is left in the base case, selecting random regulated products from the ranked list with exponential weighting applied to the rank; and for each case, until a total case quantity is at the upper bound, first, randomly selecting a remaining regulated product based on exponential weighting of the rank and adding it to a random case; and second, selecting an unregulated product and adding it to a random case; running a plurality of parallel simulations based on the set of training data; and evaluating a performance of each simulated case. In some embodiments, a software module conducting a data collection stage further performs generating an affinity matrix comprising a set of weights representing relationships between products. In some embodiments, a software module conducting a parallelized simulation stage further performs, prior to selecting an unregulated product, randomly selecting a remining regulated product and adding it to a case based on the affinity matrix. In some embodiments, the number of cases is received from a machine learning process. In some embodiments, the base case allotment is received from a machine learning process. In some embodiments, higher demand products have higher relative case quantity bounds and lower demand products have lower relative case quantity bounds. In some embodiments, the ranked list of products is determined based on at least the percentage a product contributes to revenue, the probability the product is added to a customer's cart, and an average size of order in which the product appears. In some embodiments, the ranked list of products is determined by a machine learning process. In some embodiments, the upper and the lower case quantity bound for each product is determined by a machine learning process. In some embodiments, the affinity matrix is generated by a machine learning process. In some embodiments, the base case allotment represents a predetermined percentage of the upper regulated inventory case value. In some embodiments, the software module conducting the parallelized simulation stage further returns one or more of the top performing simulated cases. In some embodiments, a software module conducting a data collection stage by further performing: collecting driver's data comprising: a number of shifts for one or more days, a number of drivers per shift, or both.

Disclosed herein, in some embodiments, is a computer-implemented system comprising: a digital processing device comprising: at least one processor, an operating system configured to perform executable instructions, a memory, and a computer program including instructions executable by the at least one processor to create mobile inventory case packing application for a dynamic or hybrid delivery model, the application comprising: a database of regulated and unregulated products, the regulated products subject to an upper regulated inventory case value; a software module receiving the upper regulated inventory case value and a base case allotment; a software module conducting a data collection stage by performing at least the following: building a set of training data comprising historical demand and orders; generating a ranked list of products based on demand; determining an upper case quantity bound and a lower case quantity bound for each product based on demand; and a software module conducting a parallelized simulation stage by performing at least the following: generating a simulated case based on the base case allotment by: filling a base case up to the base case allotment by sequentially traversing the ranked list, and if room is left in the base case, selecting random regulated products from the ranked list with exponential weighting applied to the rank; and until a total case quantity is at the lower bound, randomly selecting an unregulated product and adding it to the case; running a plurality of parallel simulations based on the set of training data; and evaluating a performance of the simulated case. In some embodiments, the number of cases is received from a machine learning process. In some embodiments, the base case allotment is received from a machine learning process. In some embodiments, higher demand products have higher relative case quantity bounds and lower demand products have lower relative case quantity bounds. In some embodiments, the ranked list of products is determined based on at least the percentage a product contributes to revenue, the probability the product is added to a customer's cart, and an average size of order in which the product appears. In some embodiments, the ranked list of products is determined by a machine learning process. In some embodiments, the upper and the lower case quantity bound for each product is determined by a machine learning process. In some embodiments, the base case allotment represents a predetermined percentage of the upper regulated inventory case value. In some embodiments, the software module conducting the parallelized simulation stage further returns one or more of the top performing simulated cases.

Disclosed herein, in some embodiments, is a computer-implemented system comprising: a digital processing device comprising: at least one processor, an operating system configured to perform executable instructions, a memory, and a computer program including instructions executable by the at least one processor to create mobile inventory case packing application for a dynamic or hybrid delivery model, the application comprising: a database of regulated and unregulated products, the regulated products subject to an upper regulated inventory case value; a software module receiving the upper regulated inventory case value, a base case allotment, and a number of cases; a software module conducting a data collection stage by performing at least the following: building a set of training data comprising historical demand and orders; generating a ranked list of products based on demand; determining an upper case quantity bound and a lower case quantity bound for each product based on demand; and if the number of cases is greater than one; and a software module conducting a parallelized simulation stage by performing at least the following: generating one or more simulated cases based on the number of cases and the base case allotment by: if the number of cases is more than one, for each case, filling a base case up to either the base case allotment or up to the lower bound of each regulated product by sequentially traversing the ranked list, and if room is left in the base case, selecting random regulated products from the ranked list with exponential weighting applied to the rank; if the number of cases is one, filling the base case up to either the base case allotment or up to the lower bound of each regulated product by sequentially traversing the ranked list, and if room is left in the base case, selecting random regulated products from the ranked list with exponential weighting applied to the rank to fill the base case; and for each case, until a total case quantity is at the upper bound: if the number of cases is one, randomly selecting an unregulated product and adding it to the case; if the number of cases is more than one, first, randomly selecting based on exponentially weighted rank a remaining regulated product and adding it to a random case; and second, selecting an unregulated product and adding it to a random case; running a plurality of parallel simulations based on the set of training data; and evaluating a performance of each simulated case. In some embodiments, a software module conducting a data collection stage further performs generating an affinity matrix comprising a set of weights representing relationships between products. In some embodiments, a software module conducting a parallelized simulation stage further performs, prior to selecting an unregulated product, randomly selecting a remining regulated product and adding it to a case based on the affinity matrix. In some embodiments, the number of cases is received from a machine learning process. In some embodiments, the base case allotment is received from a machine learning process. In some embodiments, higher demand products have higher relative case quantity bounds and lower demand products have lower relative case quantity bounds. In some embodiments, the ranked list of products is determined based on at least the percentage a product contributes to revenue, the probability the product is added to a customer's cart, and an average size of order in which the product appears. In some embodiments, the ranked list of products is determined by a machine learning process. In some embodiments, the upper and the lower case quantity bound for each product is determined by a machine learning process. In some embodiments, the affinity matrix is generated by a machine learning process. In some embodiments, the base case allotment represents a predetermined percentage of the upper regulated inventory case value. In some embodiments, the software module conducting the parallelized simulation stage further returns one or more of the top performing simulated cases. In some embodiments, a software module conducting a data collection stage by further performing: collecting driver's data comprising: a number of shifts for one or more days, a number of drivers per shift, or both.

Certain Terms

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about" and "substantially" refers to an amount that is near the stated amount by about 10%, 5%, or 1%, including increments therein.

Overview

Figure 24:
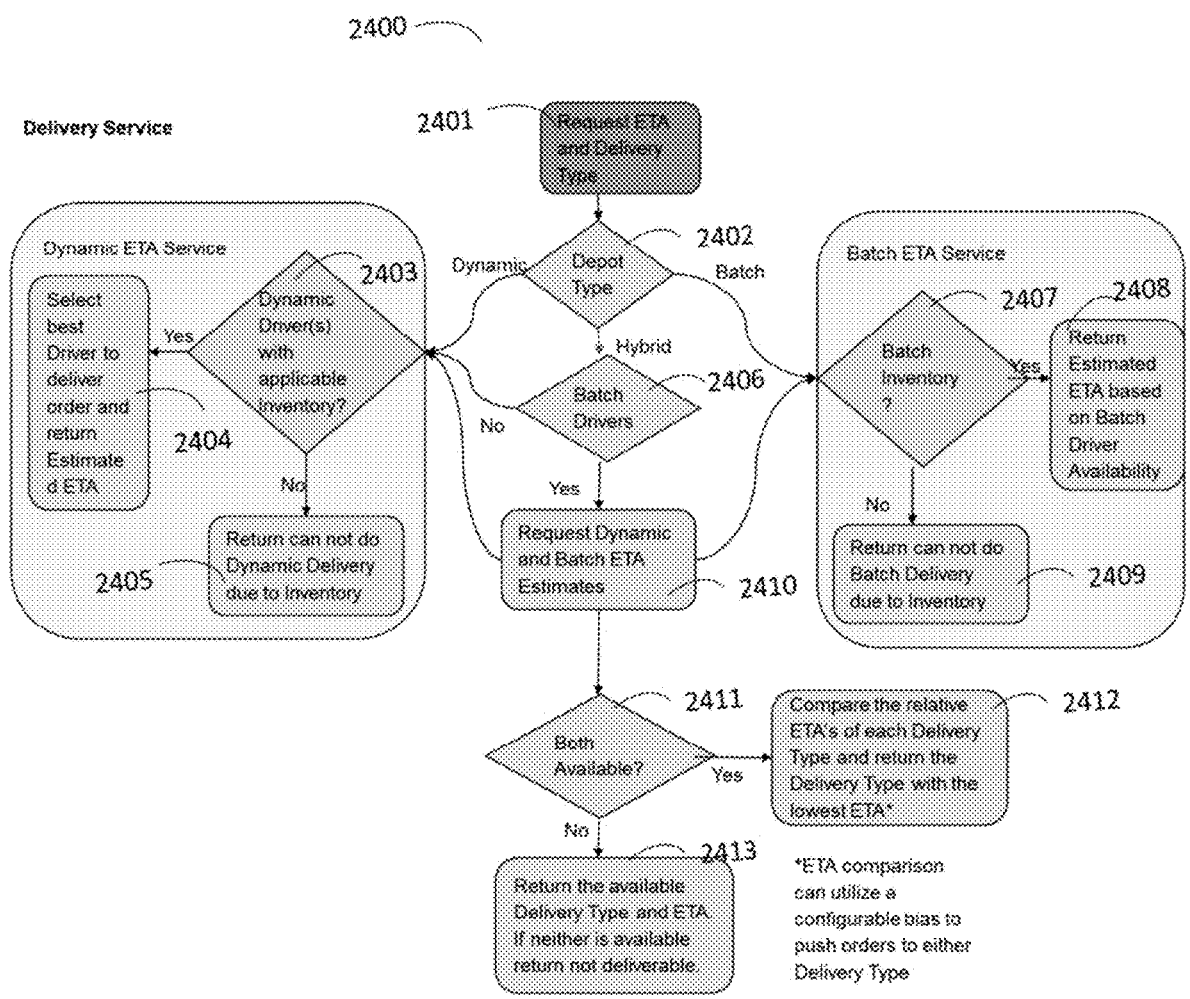
FIG. 24 shows a non-limiting flow chart of delivery service of regulated and/or regulated products using the systems and methods disclosed herein.

In some embodiments, the applications herein are configured for providing delivery service of regulated and/or unregulated products 2400. In some embodiments, the delivery service herein may select one delivery model to be used for the order contained in the request. As shown in FIG. 24, in an exemplary embodiment, the delivery service starts with a request of estimated time of arrival (ETA) for the products and the delivery type 2401. In some embodiments, the request may also contain order details such as name and quantity of products. When the depot type is dynamic only 2402, or when there is no batch driver available for the order, the systems and methods can proceed to dynamic delivery model, and first check if there are any dynamic drivers with the applicable inventory 2405. If there are drivers set to the dynamic delivery model, the systems and methods can select one driver among the qualified drivers and return the estimated ETA 2404. In some embodiments, the selection of the optimal driver is based on one or more factors disclosed herein, e.g., shortest ETA. If there is no available driver with the required inventory to satisfy the order in 2401, dynamic delivery is not feasible 2405, and batch delivery model can be selected instead by starting with 2407. When the depot type is batch only 2402 or the ETA for batch is better than that of any dynamic ETAs 2410, the systems and methods may proceed with batch delivery model and first check if batch inventory is available for the specific order(s) 2407. If there is inventory available, ETA is calculated based on batch driver's availability 2408. If there is no batch inventory 2409, then the systems and methods may optionally proceed with dynamic delivery model starting with 2403. When the depot type is hybrid 2402, and batch drivers are available 2406, the ETAs for each model is calculated 2410 and if both has inventory available 2411, the delivery type with the lowest ETA is selected 2412. Otherwise, the systems and methods may return the only available delivery type and its ETA or that the order is not deliverable when none of the delivery models is available 2413.

Figure 25:
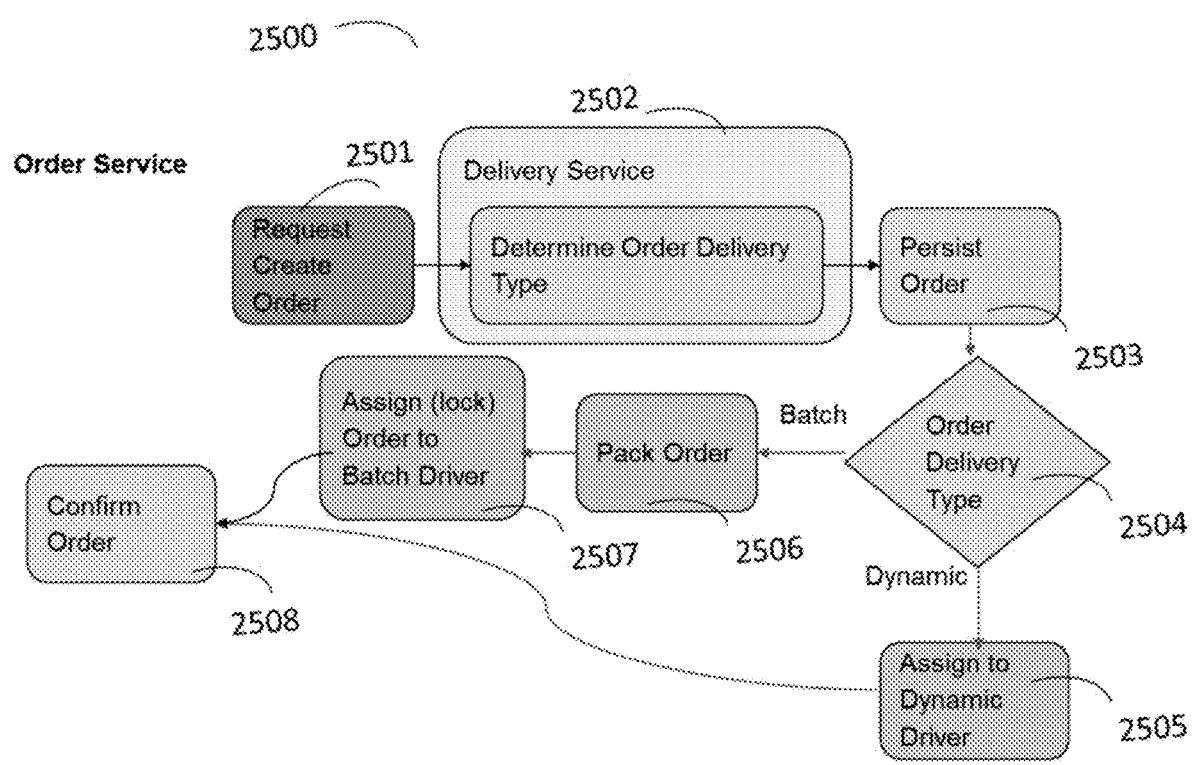
FIG. 25 shows a non-limiting flow chart of order service of regulated and/or regulated products herein using the systems and methods disclosed herein.

In some embodiments, the applications herein enable order services for regulated and/or unregulated products. FIG. 25 shows an exemplary flow chart for order service 2500 herein. In this particular embodiment, the order service may start with a request to create a new order 2501; the delivery service as shown in FIG. 24 can be used to determine one delivery model for the order 2502. If the order persists with the determined delivery model 2503, e.g., if the client approves the ETA with the selected delivery model, for dynamic delivery model 2504, the order can be assigned to a dynamic driver 2505, and the order is confirmed for delivery 2508. Alternatively, if the delivery type is batch, the order is packed at a depot 2506, and the order is assigned to a batch driver 2507 and the order is confirmed for delivery 2508.

Regulated Products

In some embodiments, the systems and methods are configured for delivery of regulated products. In some embodiments, there are specific rules, regulations, and/or guidance regarding the purchase, delivery, and usage of such regulated products. As an example, the regulations or rules are on the total value of regulated products that each vehicle may carry at any given time. As another example, the regulation or rules are on the total value or amount of regulated products that each customer can purchase for a given time period. In some embodiments, the regulations or rules can vary for different product, different delivery territory, or different characteristics of the consumer.

In some embodiments, the regulated product herein imposes more constraints on the delivery of such products when compared with unregulated products. In some embodiments, the systems and methods herein are configured specifically for fast, convenient, and efficient delivery of such regulated products.

In some embodiments, the regulated products herein may include prescription drugs, medical devices, recreational drugs, bio-hazardous products, or any other regulated products.

Unregulated Products

In some embodiments, the systems and methods are configured for delivery of unregulated products, or any other products that are not subject to regulation, rules and/or guidance regarding the purchase, delivery, and usage of such products. In some embodiments, there is no limit for the total value of unregulated products that each vehicle may carry. For example, the unregulated products may be unregulated accessories associated with the regulated products.

Delivery Vehicles

In some embodiments, the systems and methods use delivery vehicles. In some embodiments, the delivery vehicles herein include one or more transportations means for delivering the product, such as bikes, scooters, cars, e-bikes, etc. In some embodiments, the delivery vehicle is operated manually or automatically.

Delivery Territories

In some embodiments, the systems and methods are associated with one or more delivery territories. In some embodiments, one or more driver may be assigned to one or more delivery territories. In some embodiments, one or more depots may be assigned to one or more delivery territories. In some embodiments, each territory may include the same regulations for one or more regulated products. In some embodiments, the territory may be dynamically adjusted based on empirical data or simulation data of deliveries. In some embodiments, the territory may be determined at least in part based on the inventory case of a delivery vehicle serving therewithin. In some embodiments, the territory may be determined at least in part based on the inventory of a depot serving therewithin. In some embodiments, the territory may be determined at least in part based on the regulation and/or rules of one or more regulated products.

Depots

In some embodiments, the systems and methods are associated with one or more delivery depots. In some embodiments, a delivery depot herein is equivalent to a product depot, a depot, or a warehouse. In some embodiments, one or more drivers are assigned to deliver from one or more delivery depots. In some embodiments, one or more depots are associated to each delivery territory. In some embodiments, one depot is associated with multiple delivery territories. In some embodiments, each depot has an inventory including one or more regulated products. In some embodiments, the inventory of a depot is dynamically adjusted based on empirical data or simulation data of deliveries. In some embodiments, the inventory of the depot is determined at least in part based on the inventory case of a delivery vehicle serving therewithin. In some embodiments, the inventory of a depot is determined at least in part based on the territory that the depot is serving.

In some embodiments, one or more depots may correspond to a dispensary, wherein the corresponding dispensary supplies the related depots with products to be delivered. In some embodiments, the dispensary and each related depot can be seen as having a parent-child relationship, wherein the dispensary is the parent. In some embodiments, a dispensary level demand is based on the number of units (of product) sold per day as aggregated across all the related depots. In some embodiments, the dispensary level demand can be the number of units sold per week, sold per month, sold per year, or the sale of a number of units across any given time frame. In some embodiments, product demand, as used herein, can be based on demand at a given depot, i.e. at the depot level. In some embodiments, a depot level demand is determined by multiplying a dispensary level demand by the percentage that a given depot contributes to the dispensary's total deliveries. In some embodiments, the product demand can also be based on the dispensary level demand.

Dynamic Model

In some embodiments, the systems and methods herein include a software module providing the dynamic delivery model to one or more drivers or vehicles. In the dynamic delivery model, a content of the inventory case can be determined based at least on a predicted demand and/or the upper inventory case value threshold. In the dynamic delivery model, one or more of the received orders are assigned as they are received to one or more vehicles operating in the dynamic delivery mode. In some embodiments, the dynamic delivery model is favored over other delivery models, such as the batch delivery model due to its shorter estimated time of arrival. In some embodiments, the dynamic delivery model is applied if possible based on the content of the inventory cases in the vehicles operating in the dynamic delivery model. In some embodiments, the dynamic delivery model is automatically applied if there is no checkout error. In some embodiments, the dynamic delivery model is automatically applied if the system and methods find a driver in the dynamic delivery model and can provide the specific combination of regulated products in his inventory case.

FIG. 1 shows an exemplary flow chart of a dynamic delivery model 100 disclosed herein. When selecting a delivery model or a driver in dynamic delivery, factors for selection of a driver and/or delivery model can include, but are not limited to: delivery costs; geographic distribution of drivers after a delivery; standing of a customer's order history; and type of customer. Referring to FIG. 1, in a particular embodiment, when a new order is requested 101, one or more drivers are checked for available inventory. If no driver has the inventory that can satisfy the order, no order is created 105. If one or more drive can satisfy the order, one driver is selected from them, for example, based on ETA for the customer 103. After driver selection, the driver is directed to deliver the order to the customer using in-car inventory 104. The product(s) are delivered to the customer 106 using dynamic mode.

In dynamic delivery, each depot has a territory and a fleet of cars which can deliver to all customers in a territory. Additionally, each car has its own inventory. This method dispatches cars with the lowest ETA, using the location of the driver and the customer, for product delivery.

The benefit of the dynamic delivery model is, with sufficient cars, customers can receive low ETAs on product delivery. In some embodiments, all inventories being sold are in the cars and the cars do not return to a depot to replenish any requested items not currently available in the cars. In some embodiments, if no single car has the combination of products the customer wants, the customer's order cannot be satisfied.

In some embodiments, the driver is selected based on available inventory and location to minimize the ETA by selecting the nearest available driver to deliver the customer's order. In some embodiments, the driver selection can be optimized for one or more of: driver geo-distribution (to lower the average ETA for all customers); preferred customers subscribing to the service; delivery costs; future case utility (e.g., ranking drivers such that filling the current order from a given driver does not deplete their inventory disproportionality vs. other drivers so the chosen driver's case has better future utility compared to others); driver shift plans: optimizing to weigh the remaining time in a given driver's shift such that consideration is given to fulfilling orders from drivers who are later in their shift vs. others (since they are coming off the road sooner).

In some embodiments, a single depot has a fleet of drivers that can exist as batch, dynamic, and/or or hybrid drivers. Hybrid delivery model may enable a fleet of cars carrying inventory for low ETAs combined with a set of cars set to batch delivery ensuring all orders can be satisfied.

In some embodiments, each customer order is evaluated and assigned the best delivery model for that order. The factors include but are not limited to: in-car inventory for all dynamic drivers; available drivers; estimated time for arrival using batch and/or dynamic models; and other orders in the system (now and in the future).

In some embodiments, dynamic delivery model is a primary delivery model where drivers leave the depot with a case of products not designated for any specific order at the time of departure from the depot. Drivers are dynamically assigned orders as they come in throughout the day.

In some embodiments, case value restrictions, e.g., a $3 k case limit of carrying regulated products per California regulations, affect the inventory of a driver and, in some embodiments, cause a significant increase in the product combination error. In some embodiments, dynamic model is not allowed in a certain territory due to specific regulations.

In some embodiments, one or more of the received orders are assigned based at least on routing efficiency comprising distance and estimated delivery time as they are received to one or more vehicles operating in the dynamic delivery mode.

Batch Model

In some embodiments, the systems and methods herein include a software module providing the batch delivery model. In some embodiments, the content of the inventory case is determined based at least on a plurality of the received orders and/or the upper inventory case value threshold. In some embodiments, the plurality of the received orders is assigned to a vehicle operating in the batch delivery mode. In some embodiments of the batch delivery model, the systems and methods generate a manifest for the regulated products in the plurality of the received orders.

In some embodiments, in batch delivery, customers order products from the depot. Then, depot employees optionally pack orders at the depot and drivers pick up orders at the depot and then deliver the products to customers. Note that drivers may optionally leave the depot with multiple orders. In another model, e.g., dynamic delivery model, a group of drivers in some embodiments each has its own in-car inventory. In dynamic delivery, an algorithm can select the driver and car with the available inventory while having the optimal system-level ETA (estimated time of arrival) to the customer location to fulfill customer orders.

In further embodiments, batch delivery comprises selling from the depot's inventory rather than inventory in the driver's cars. This optionally prevents the issue where customer orders cannot be satisfied by insufficient inventory in any one car, but the deliveries always originate from the depot and can provide longer ETAs to some customers, e.g., those located farther from the depots.

In some embodiments, batch delivery is where drivers leave the depot with a fixed set of orders and a manifest reflecting such orders and return to the depot upon completion of the manifest before being assigned further orders.

Figure 2:
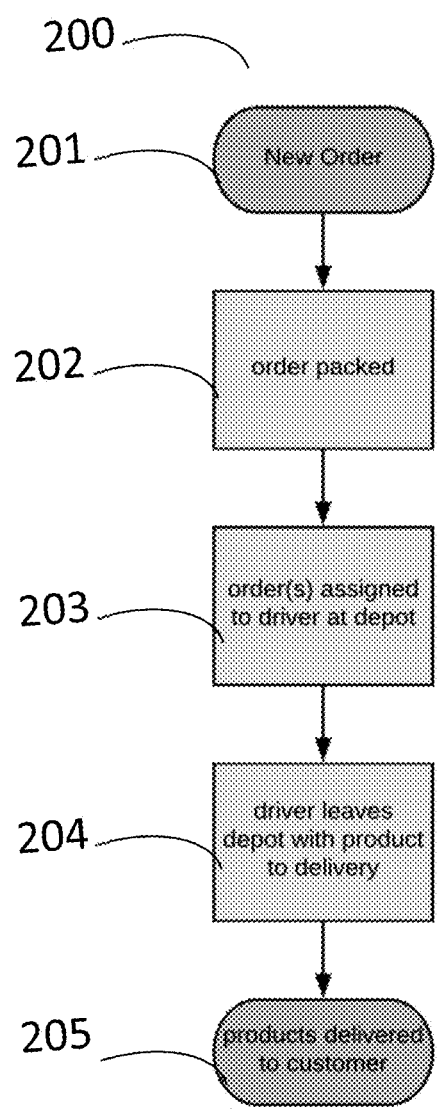
FIG. 2 shows a non-limiting flow chart of the batch delivery model disclosed herein.

Referring to FIG. 2, in a particular embodiment, portrays a batch delivery model 200. When a new order is generated, it is packed at the depot 202 and assigned to a driver 203. In some cases, the driver is at the depot when the order is readily packed. The assigned driver leaves the depot with the product and optionally additional products for different orders 204. The products can be delivered to the customer by car using the batch model 205.

In some embodiments, one or more of the received orders are batched based at least on routing efficiency comprising distance and estimated delivery time and assigned to a vehicle operating in the batch delivery mode.

Figure 3:
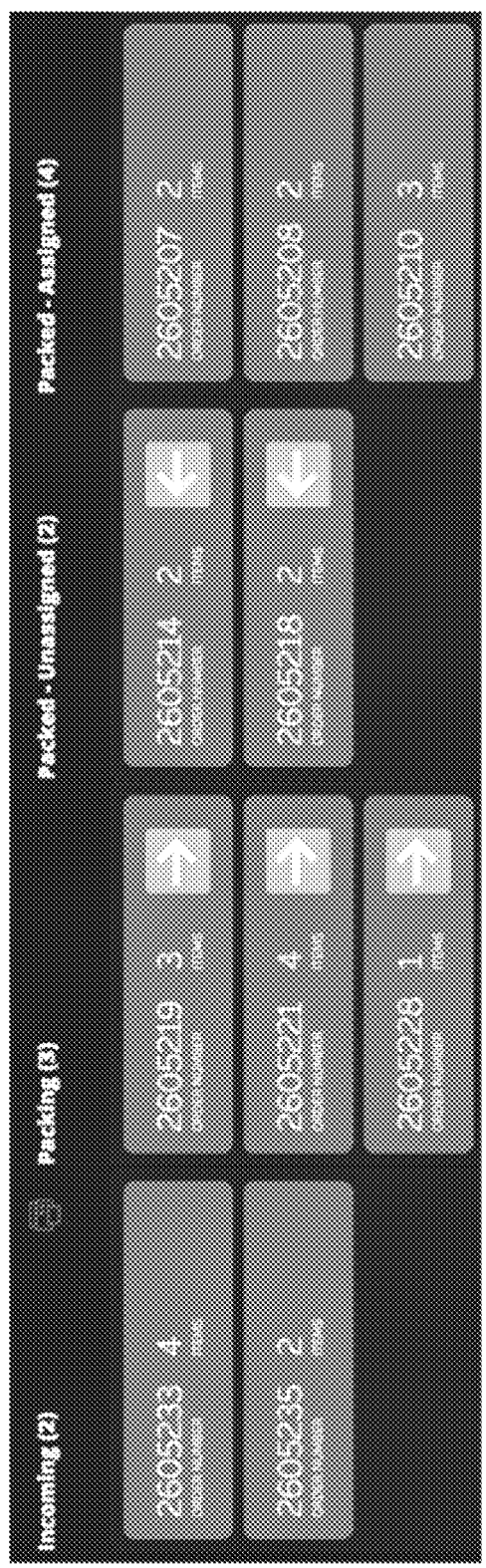
FIG. 3 shows a non-limiting exemplary graphical user interface (GUI) for a user that packs orders with batch delivery model.
Figure 7:
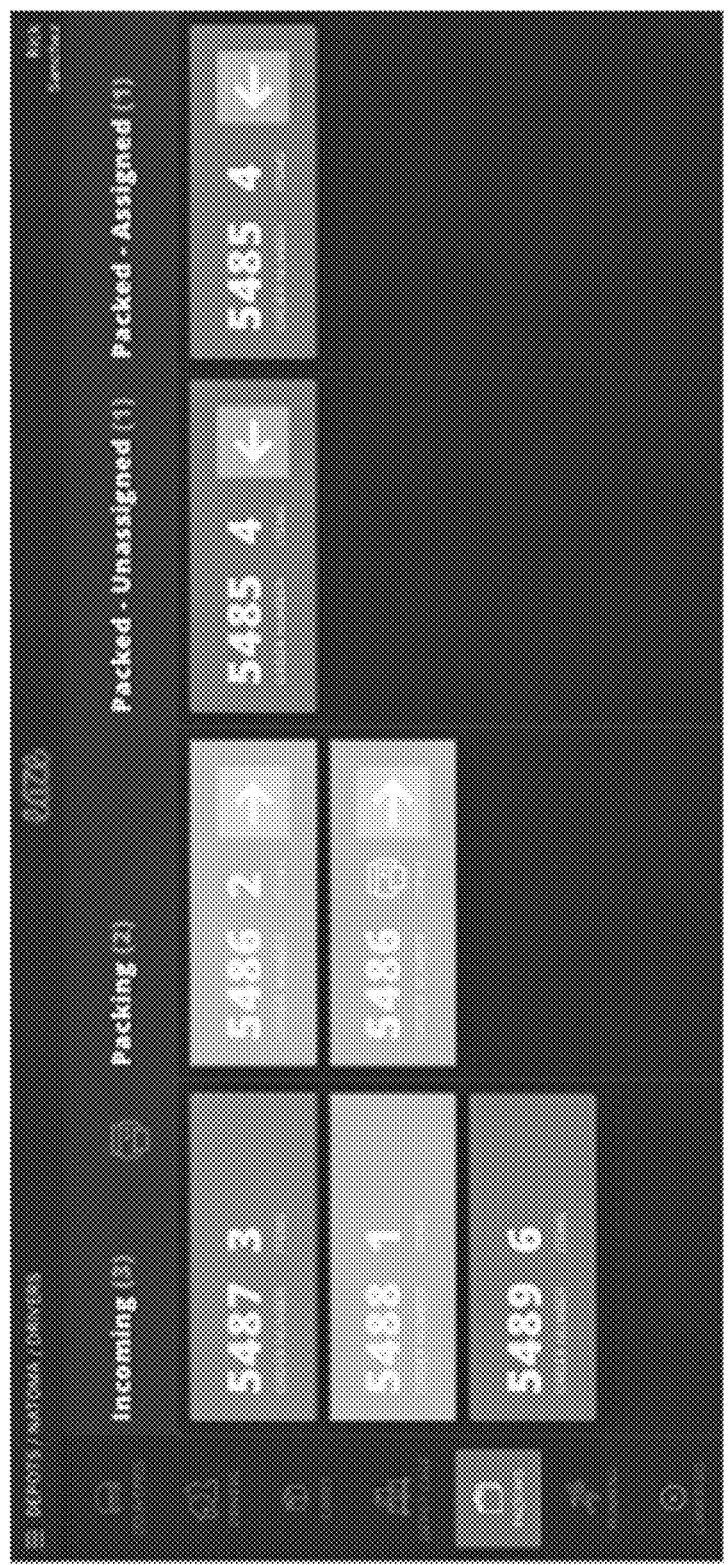
FIG. 7 shows a non-limiting exemplary graphical user interface (GUI) for a user that packs orders with batch, dynamic, and/or hybrid delivery model.

Referring to FIGS. 3 and 7, in particular embodiments, are graphical user interface (GUI) for delivery task management, optionally for packers. In this embodiment, orders, e.g., including orders with order number and number of items within are listed under different categories for review such as "incoming," "packing," "packed and unassigned," and "packed and assigned (to driver)." "Incoming" category includes orders that haven't been packed yet. Expeditors can print these orders to printers to assign the packing job to packers. "Packing," column includes orders that have been printed. Expeditors can receive packed bags from packers and mark these orders as packed. If needed, the Expeditor can reprint these. In some embodiments, the "packed and unassigned" column shows orders that are packed and orders that are waiting to be assigned to a driver's manifest. Optionally, these orders can be automatically assigned to drivers. "Packed and assigned (to driver)" are orders have been assigned to driver(s) and transitioned to the "runner" interface for next steps. As show in FIG. 7, orders can be color-coded to indicate different status of the order. The orders can automatically move from one column to another. In some embodiments, the packer can move the orders manually by interacting with the arrow near the order number.

Referring to FIG. 4, in a particular embodiment, is an exemplary order sticker including order information such order number, number of items therewithin, customer information, and detailed information regarding the items. In some embodiments, the expeditor and/or packer can stick the printout to a child-proof bag. This can help runners and drivers determine the order number/customer name for each bag.

Figure 6:
FIG. 6 shows a non-limiting exemplary task management interface for managing runners with batch, dynamic, and/or hybrid delivery model.
Figure 8:
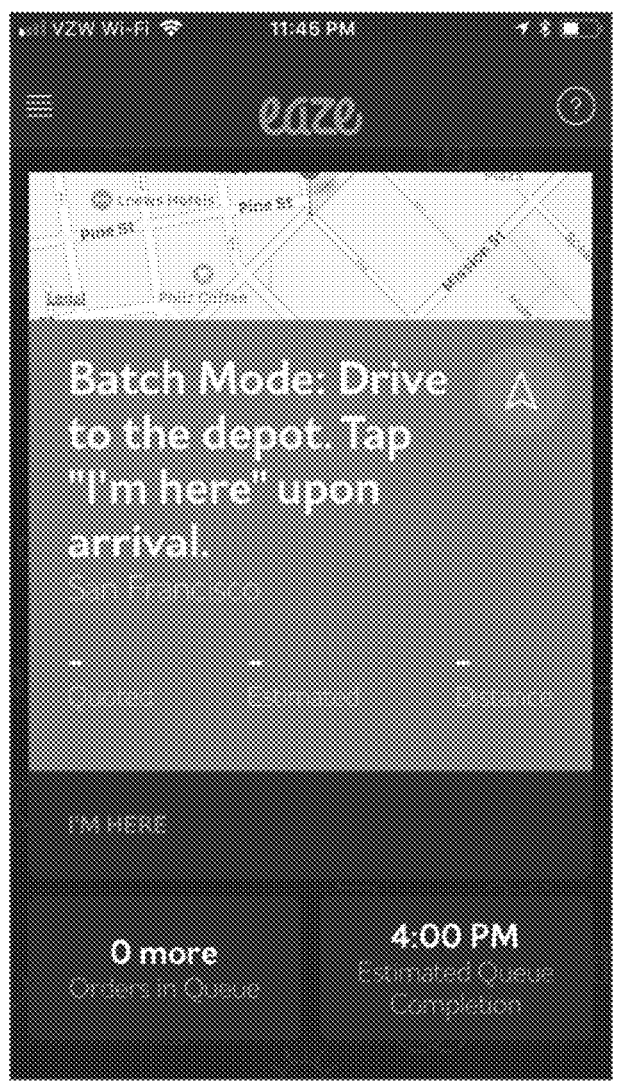
FIGS. 8-12 show non-limiting exemplary graphical user interfaces (GUIs) of a driver's application with batch, dynamic, and/or hybrid delivery model.

Referring to FIG. 6, in a particular embodiment, is an exemplary GUI for a user to manage runners. The runners can send packed orders to different drivers. In some embodiments, drivers automatically appear on this GUI once they arrive at the depot and/or mark "I'm here" in the driver's application as shown in FIG. 8. Expeditors print and assign driver manifests to runners. Drivers can automatically move to "out for delivery" category once they sign to confirm that they received their orders from the runner, optionally in the driver's application as shown in FIG. 9.

Figure 9:
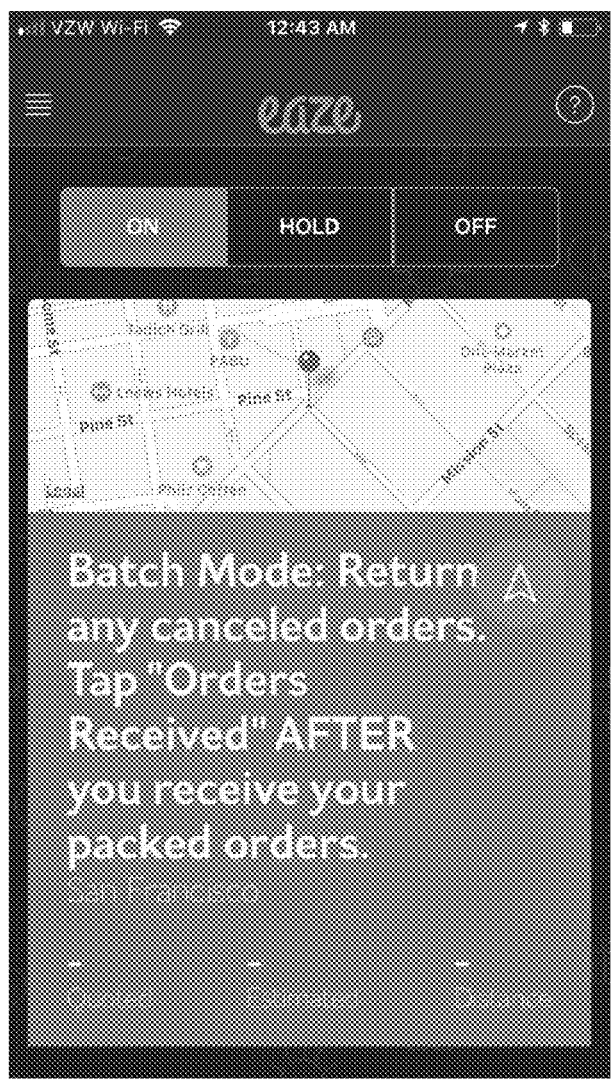
Figure 10:
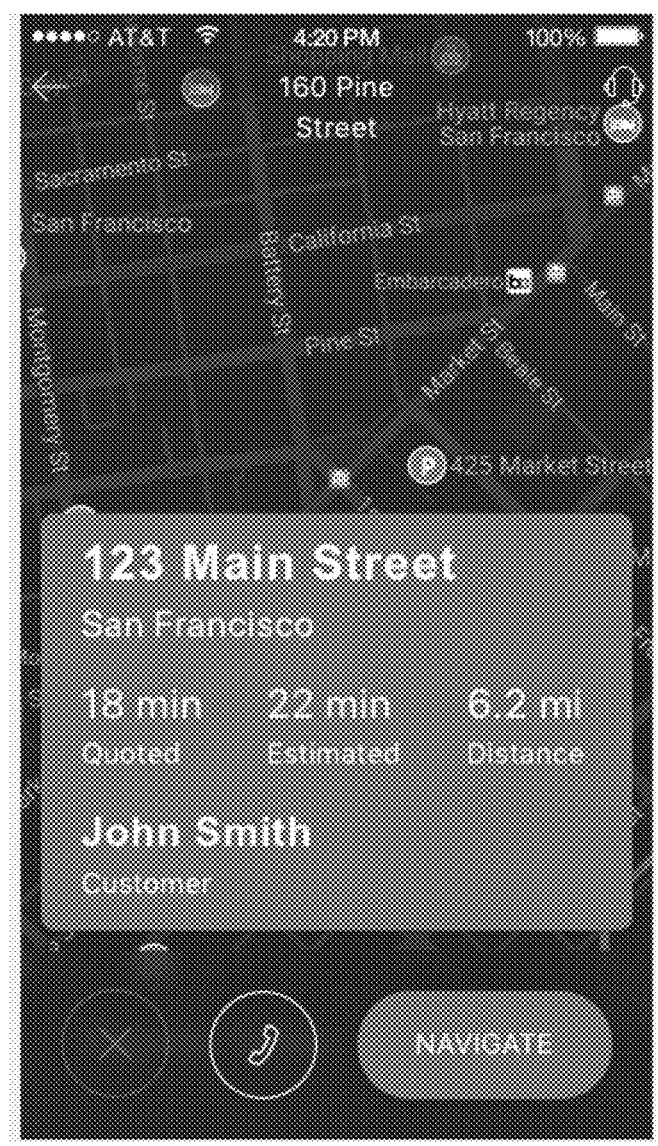

FIGS. 8-10 show exemplary GUIs in the driver's application. In some embodiments, the GUI's display the delivery model that the driver is in and instructions for the driver, such as "drive to the depot," and "tap 'I am here upon arrival." The GUI can also indicate the number of orders in queue to be delivered and estimated time to queue completion. FIG. 10, in a particular embodiment, shows the order details to indicate an active batch order.

Figure 11:
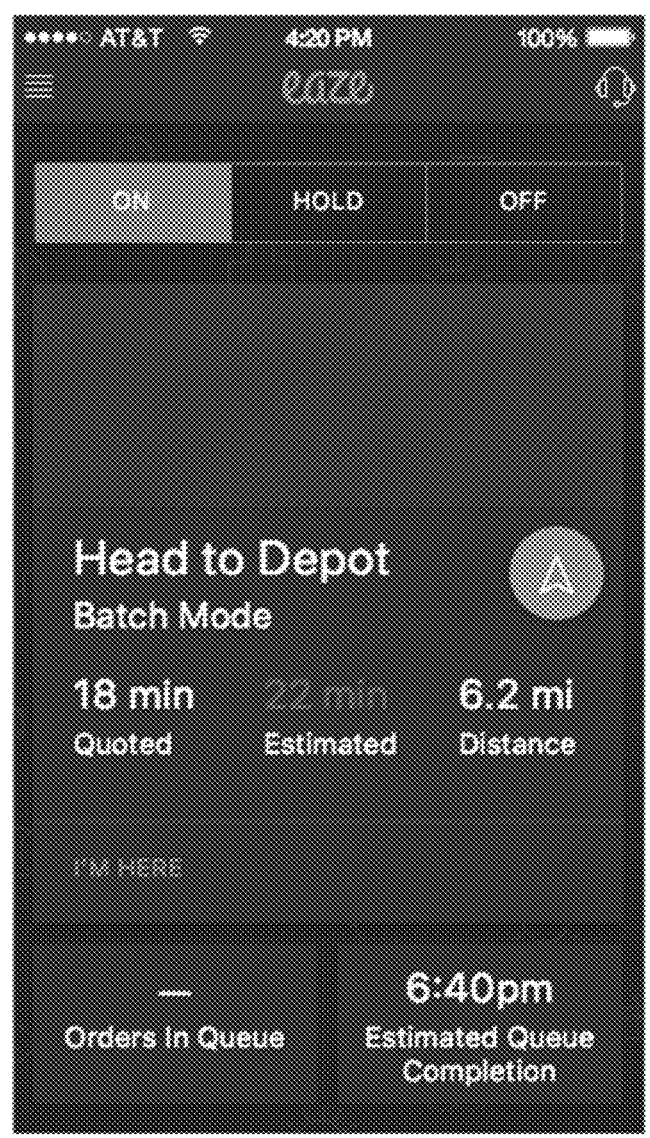
Figure 12:
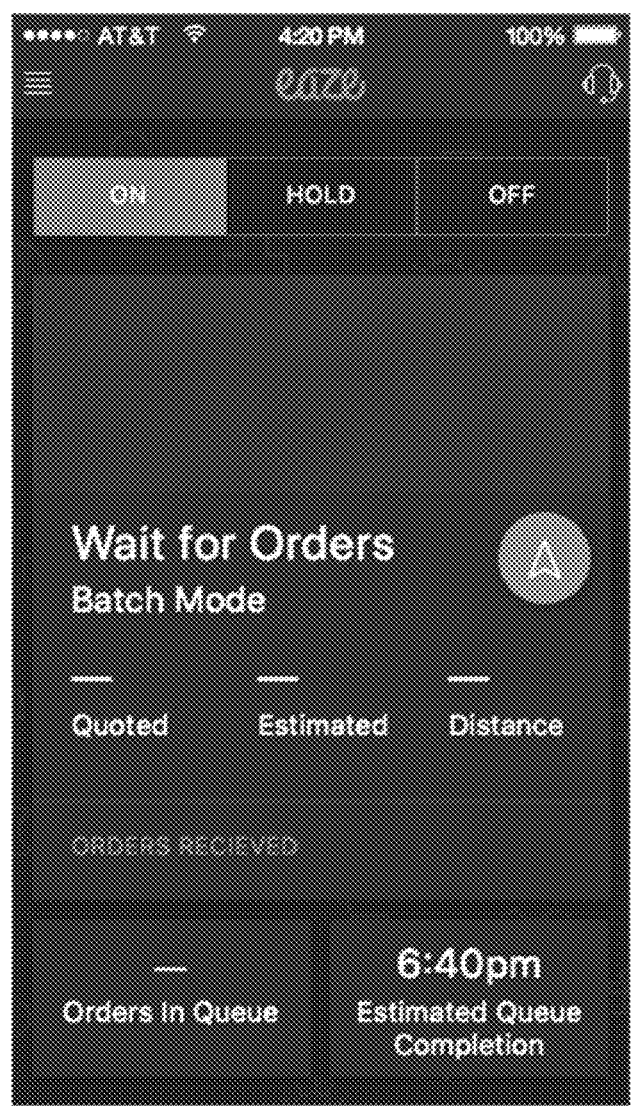

FIGS. 11-12 show exemplary GUIs in the driver's application indicating the current status of the driver such as currently heading to the depot or waiting for orders from runners. Information associated with the driver's status can be shown on the same GUI, e.g., estimated distance and time to get to the depot.

Hybrid Mode

In some embodiments, the systems and methods are configured for delivery of products by car. Such product may be regulated products. The inventory of products may be in the depots and/or the cars. Additionally, each depot has an assigned territory in which can satisfy all customer orders. The systems and methods herein may combine two delivery models: batch and dynamic. The systems and methods herein may include a hybrid delivery model which combines and selects one of the two delivery models, i.e., batch and dynamic, based on one or more factors such as regulation of the products, estimated time of arrival, and available inventory in batch and/or dynamic models. In some embodiments, such selection to use one or more delivery models for one or more orders herein is automatic and intelligent. In some embodiments, such selection to use one or more delivery models for one or more orders herein is manual. In some embodiments, such selection is based on one or more factors disclosed herein. In some embodiments, such selection is for one or more of: vehicles, territories, and/or depots. In some embodiments, such selection includes assigning one or more orders, vehicles, territories and/or depots to one or more delivery models in parallel.

Figure 13:
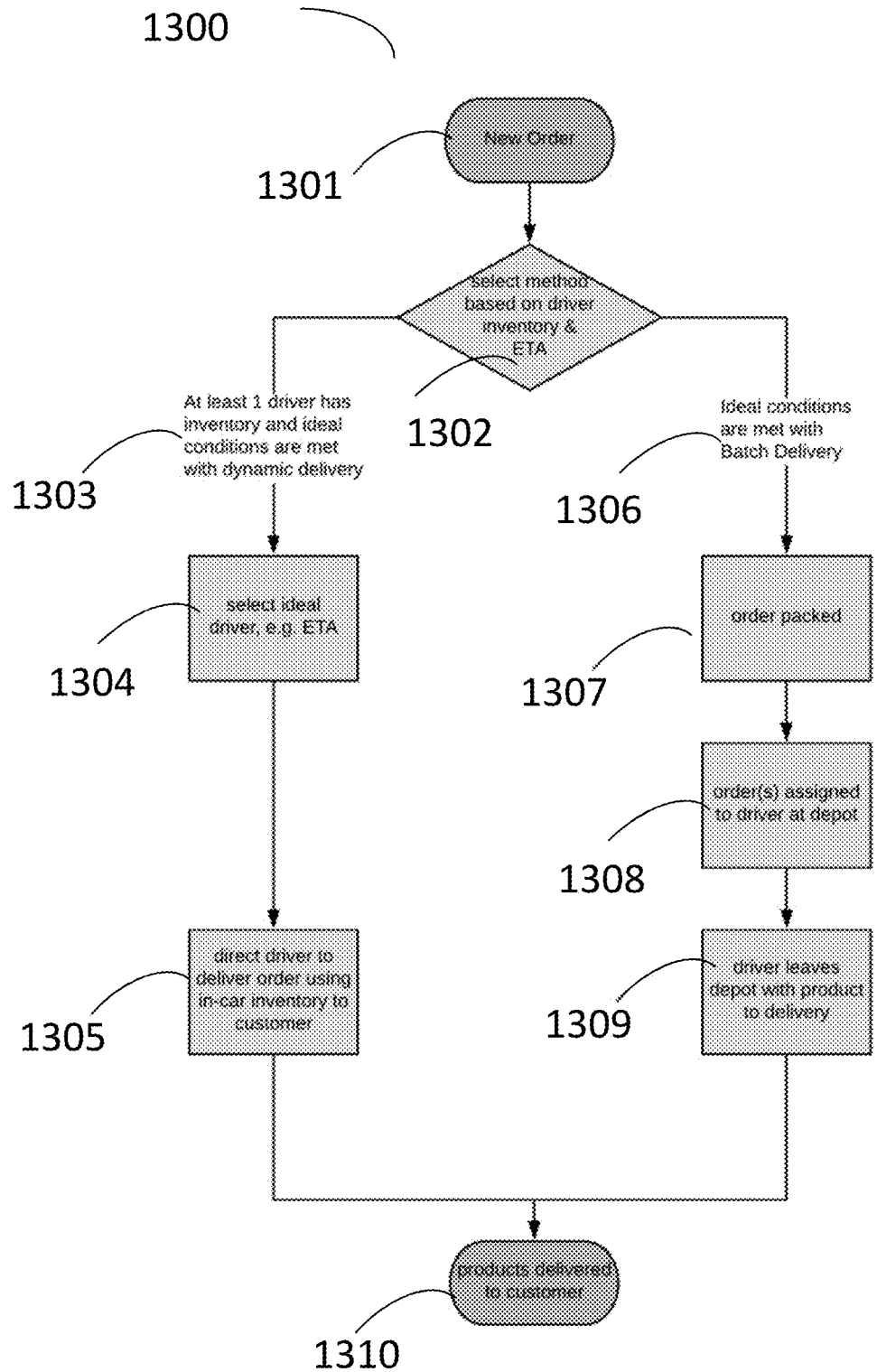
FIG. 13 shows a non-limiting flow chart of the hybrid delivery model disclosed herein.

In some embodiments, hybrid model combines batch and dynamic delivery models. FIG. 13 shows an exemplary flow chart for hybrid delivery model 1300. In this particular embodiment, after a new order is received 1301, the algorithm can evaluate the customer order and selects the more suitable delivery model 1302 based on one or more of: estimated time arrival for the customer, product availability, driver availability, and the ETA's for both delivery models. In some embodiments, the selecting the suitable delivery model includes determination if the conditions for dynamic model are met or not. In some embodiments, the batch model is selected only if conditions for dynamic model are not met. In some embodiments, if conditions for both models are met, selection is based on additional factors disclosed herein, such as regulation of the product to be delivered.

If at least one driver has the required inventory and the conditions are met with dynamic model 1303, a driver can be selected 1304 and the driver can be directed to deliver the order use only in-car inventory 1305. If conditions for selecting the batch model are met 1306, an order can be packed 1307 and assigned to a driver at the depot 1308. The driver leaves the depot with the product to deliver the product 1309. Using a hybrid model, the product is delivered either by dynamic or batch model 1310.

In some embodiments, a single depot can be set to 1 of the 3 delivery models: dynamic, batch, or hybrid. The setting can depend upon local laws/regulations of the products to be delivered or logistics of the depot's location relative to its territory, e.g., a depot that is far can be removed from its territory.

Drivers can be assigned to either batch or dynamic delivery with the ability to change a driver's delivery type throughout a shift.

In some embodiments, the order assignment determines if an order is assigned/routed to batch or dynamic drivers based on a) available inventory and b) delivery time.

Figure 23:
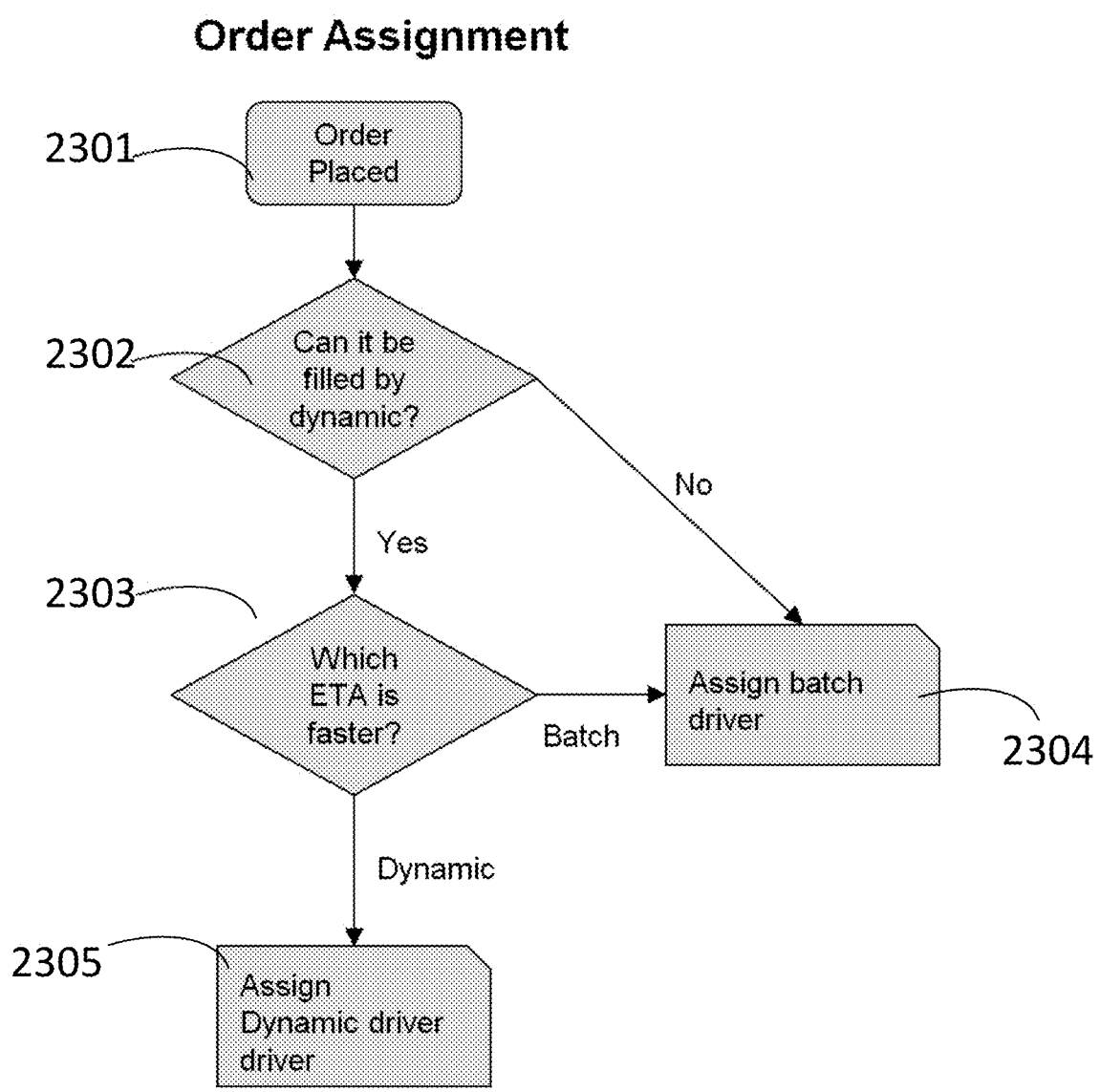
FIG. 23 shows a non-limiting flow chart of assigning orders to the dynamic or batch delivery model using the systems and methods disclosed herein.

FIG. 23 shows an exemplary flow chart for an order assignment method 400 herein. In this particular embodiment, when an order is placed 2301, the order assignment method checks if the order can be fulfilled by dynamic model or not 2302, e.g., determining whether any driver in dynamic model has the inventory. If yes, the assignment method further determines if the ETA using dynamic is faster than an ETA using batch or not 2303. If it is faster using dynamic, then the order is assigned to a selected dynamic driver 2305. If the order cannot be fulfilled by dynamic model 2302, or if the ETA of dynamic is longer than the ETA of batch 2303, the order is then assigned to a batch driver 2304.

Figure 17:
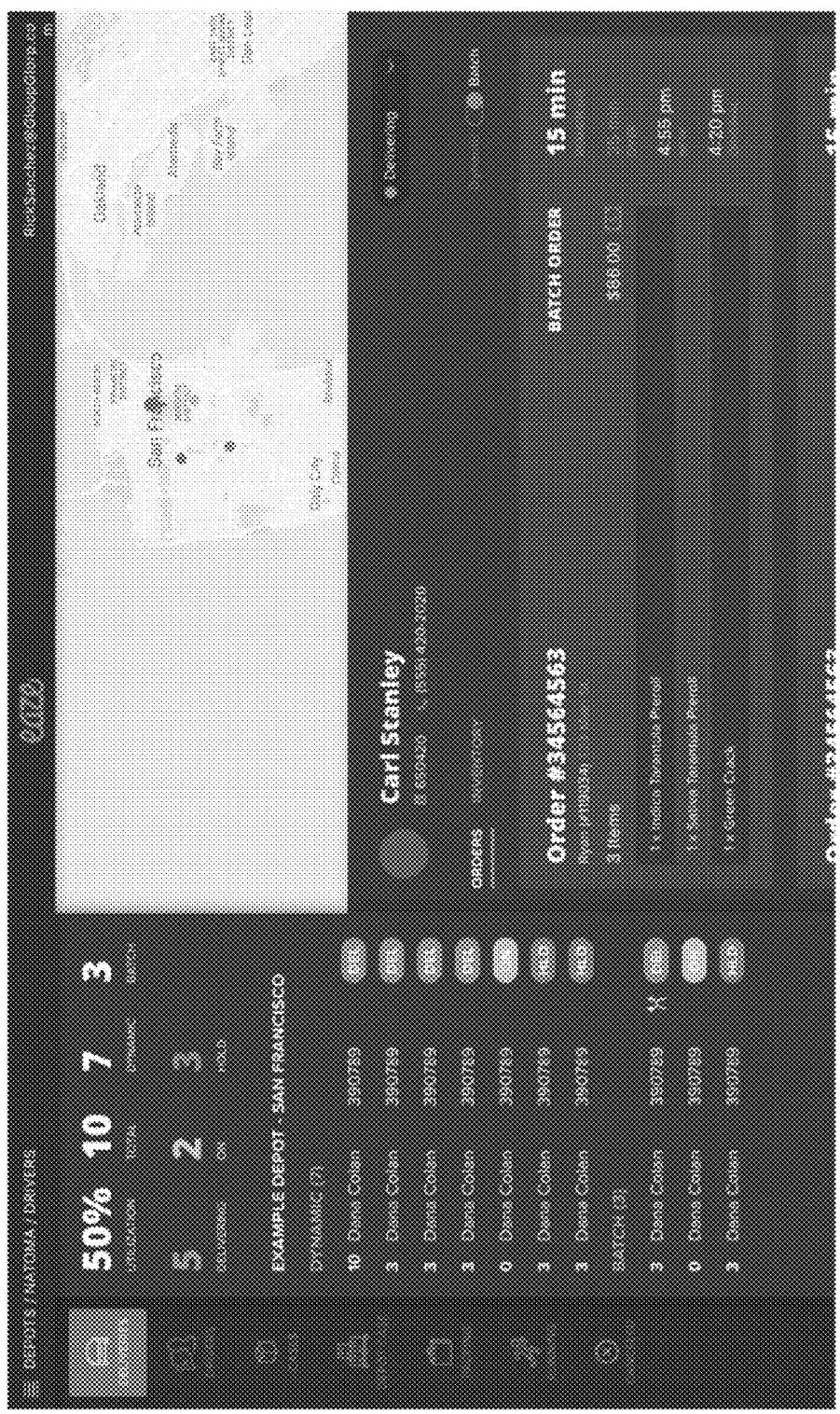

FIG. 17 shows exemplary graphical user interface (GUI) of deliverers. In this particular embodiment, a user, e.g., administrative personnel, may select a driver's page, cases page, packing page, or a running page to view and/or edit information.

Figure 16:
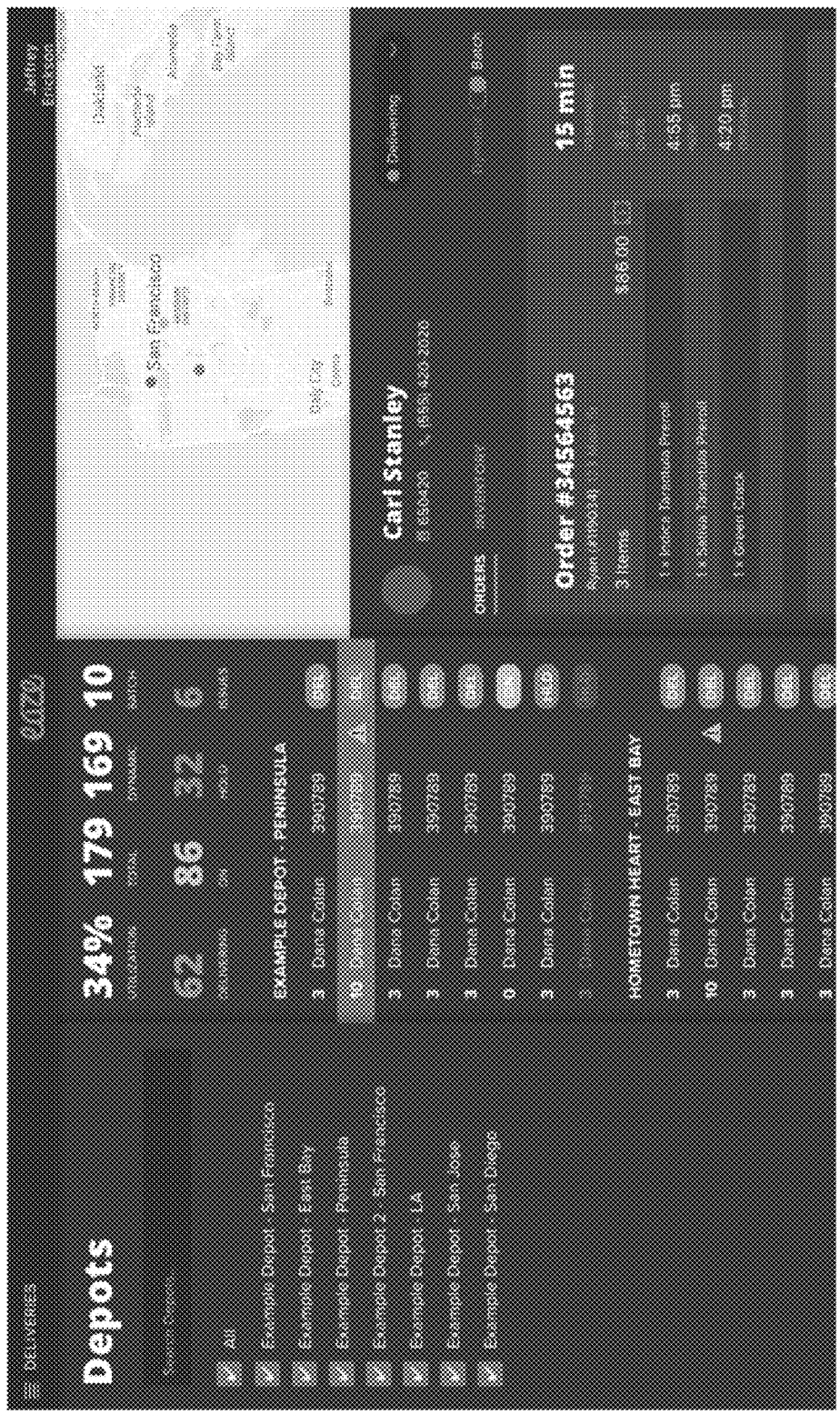

FIG. 16 show exemplary graphical user interface (GUI) of deliverers when a user selects the deliverers page. In this particular embodiment, a depot list appears on the left side. Selecting individual depot(s) can filter the driver list down to that/those depot(s). In this embodiment, a map can be zoomed to include the location of all of the relevant drivers. In this embodiment, the GUI also includes a driver list (middle panel). The driver list can include summary information at the top, e.g., how many total deliveries the driver is handling, and how many of them are of the dynamic or batch model. Each selected depot may have a list of orders and the status of the order, e.g., "del"—being delivered. In some embodiments, "Driver Details" provides basic information on the driver including name, driver ID and phone number. Optionally, one can also view the current "driver mode" (Delivering, On, Hold). Order details are optionally shown at the bottom of the right panel. In some embodiment, this view shows all active orders with details including delivery information (Driver ID, initial ETA, and current ETA) as well as order details (Order ID, delivery address and items/quantities). Selecting one of the orders can, in further embodiments, bring up order details such as the driver's information, order number, estimated time remaining for the order to be delivered, and content of the order. In some embodiments, a user may use the GUI to switch a driver from one delivery model to another. In some embodiments, the systems and methods herein may automatically switch one or more drivers from one delivery model to another delivery model based on one or more of: the received orders, the predicted consumer demand and/or the case inventory. In some embodiments, there is a visual identification of different delivery types for each driver and/or each order.

Figure 18:
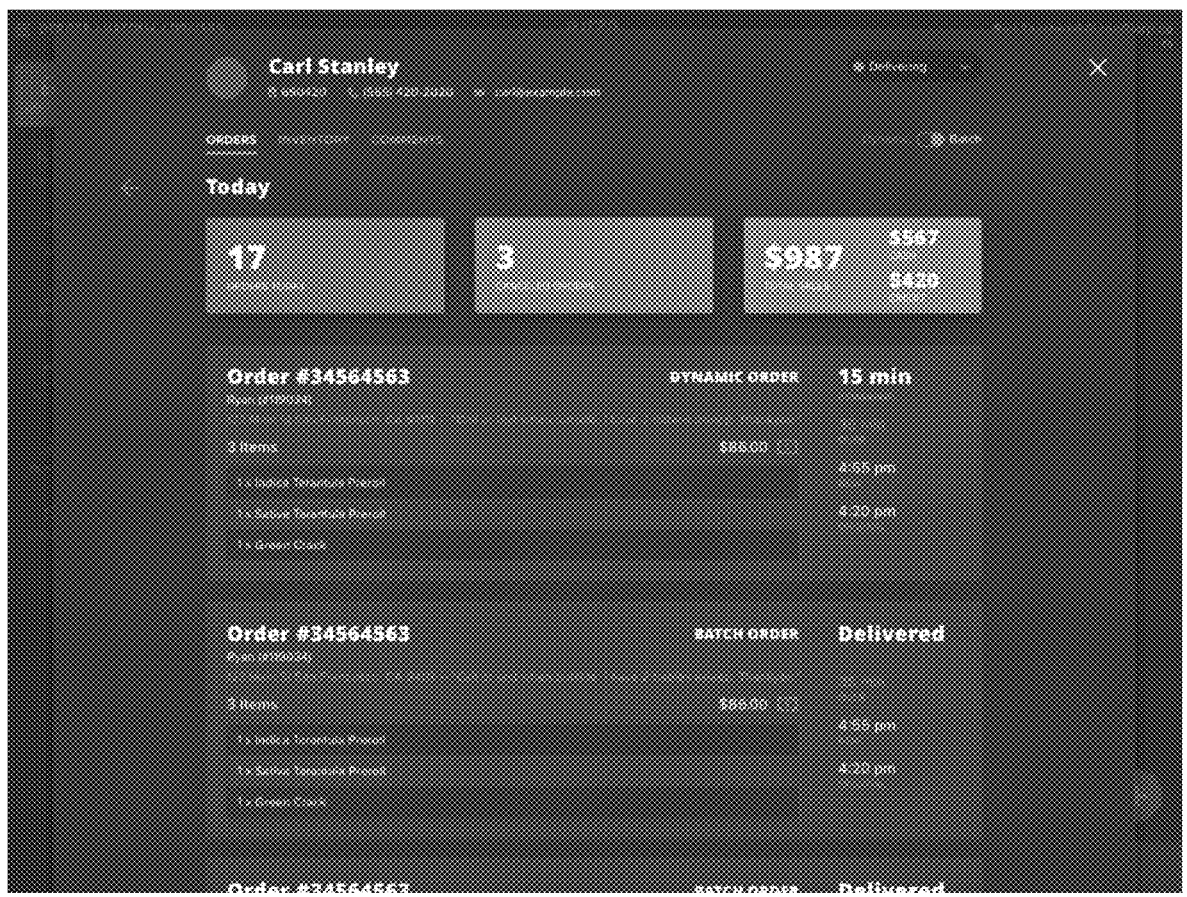
FIGS. 18-19 show non-limiting exemplary graphical user interfaces (GUI) for a user to manage drivers.
Figure 19:
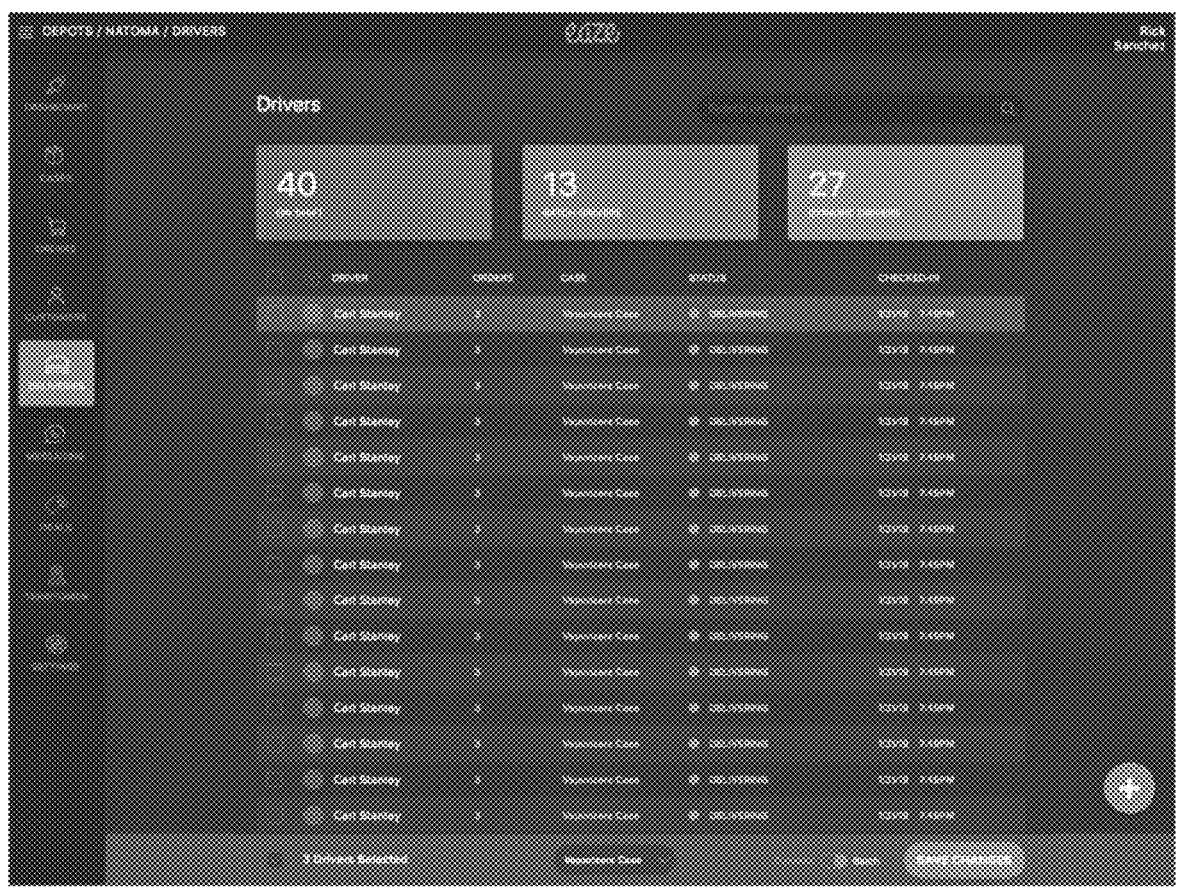

In some embodiments, the system and methods herein include a software module setting the delivery model for each vehicle and optionally switching the delivery model for one or more of the vehicles, e.g., in FIGS. 16-19. FIGS. 18-19 show exemplary GUIs of delivers for a driver. As in FIG. 18, the driver's profile section appears at the top and the profile can provide basic information on the driver such as name, driver ID, and phone number. In this embodiment, the GUI also provides an option to switch the driver between the batch and dynamic models (red arrow). Delivery status, and order history, and order model (red arrow) for one or more orders may be provided in the middle section of the driver's page. A user can view the current "driver mode" (e.g., Delivering, On, Hold). "Del" mode: Driver has an active queue of orders and can continue to receive new orders. In some embodiments, the "On" mode allows a driver to be able to receive orders but does not currently have an active queue. In some embodiments, the "Hold" mode describes driver who are not able to receive orders. This "Hold" mode can optionally be used for breaks or when returning to the depot at the end of a shift. In further embodiments, a "Del on Hold" mode can apply to drivers who switch themselves to "Hold" while they still have a queue of active orders. In this state, the driver may not receive any more orders, but they can continue to complete their outstanding queue of orders. In the same embodiment, all active orders with details including delivery information (Driver ID, initial ETA, and current ETA) as well as order details (Order ID, delivery address and items/quantities) can be listed on the GUI. FIG. 19 shows an exemplary list of drivers with a summary of driver's status at the top section of the GUI, optionally indicating the number of drivers on shift and the number of drivers under batch and/or dynamic delivery modes. In the same embodiments, the specific information of each of the driver can be listed. The user can interact with the GUI to select specific drivers and optionally view detailed information of the driver as shown in FIG. 18.

Figure 14:
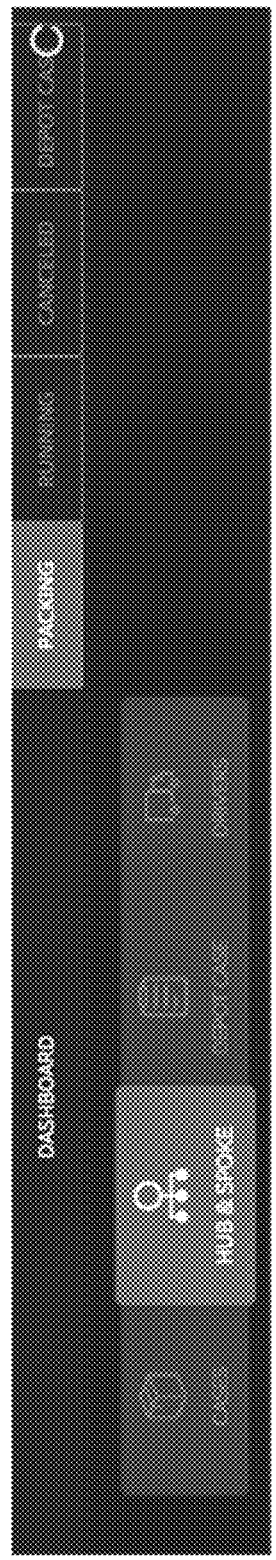
FIGS. 14-16 show non-limiting exemplary graphical user interfaces (GUIs) of a user's application with batch, dynamic, and/or hybrid delivery model.
Figure 15:
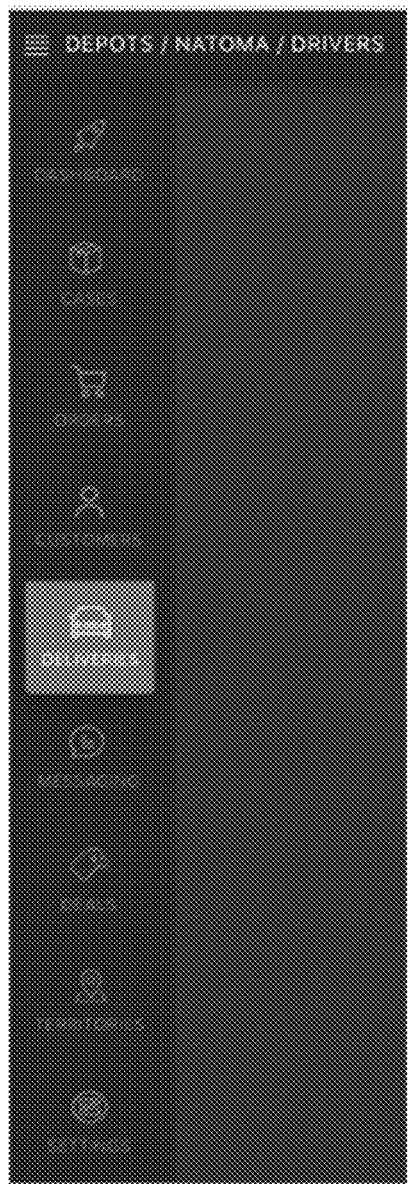

Referring to FIGS. 14-15, in particular embodiments are exemplary navigation menus on a GUI for the user using a hybrid delivery model application. The navigation menu may launch with one or more of the following categories: deliveries (default), drivers, cases, depot case, packing, running, and batch cancellations.

Figure 20:
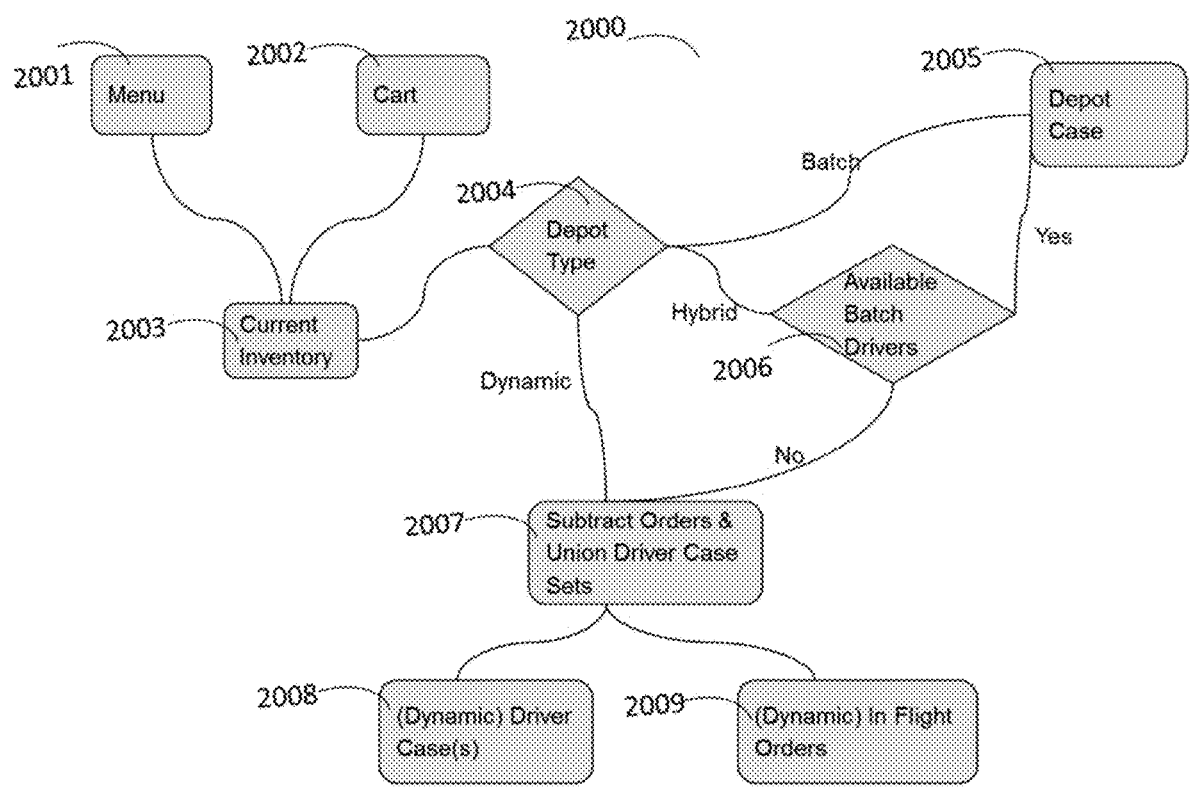
FIG. 20 shows a non-limiting flow chart for calculating inventory for menu and cart.

FIG. 20 shows an exemplary flow chart for calculating inventory 2000 for delivery models herein. In some embodiments, selections of products and functionalities for the Menu 2001 and the Cart 2002 may depend on the type of delivery models that is turned on for the depot. In some embodiments, the depot is just turned on for batch model. In some embodiments, the depot can be turned on for batch, dynamic, and/or hybrid models. The systems and methods herein may pull items off the Menu 2001 and out of Carts 2002 if items are no longer in current inventory 2003. To calculate inventory for Batch model, the Depot Case 2005 is checked for all products for sale. If an item is not in the Depot Case 2005 (e.g., sold or removed), and the depot type is batch only 2004, then it is not in the current inventory 2003, and the Menu 2001 or Cart 2002 may not contain that item. For Menus that have already been loaded in the customer's browser, a customer could still put an unavailable item in their Cart. If this happens, the Cart endpoint 2002 can remove the item from the user's Cart and with a message that item(s) have been removed from the user's Cart. Hybrid model may work the same as Batch model for inventory calculation except in the case where there is no active Batch drivers 2006.

If an item is in the Depot case 2005, the systems and methods search for available batch drivers 2006. If there is a batch driver available 2006, the item is included in the menu and can be added into the cart. If no batch driver is available, the inventory is calculated in the same way as for the dynamic delivery model. In the dynamic delivery model, the inventory is calculated from a Driver Case(s) 2008 instead of a Depot Case. To create the inventory from Driver Cases in some embodiments, each Driver Case is iterated, removing from it any inflight Dynamic Orders 2009 for that driver to get the Driver's inventory net of Orders. Then, a union of Driver Cases 2007 is done in further embodiments, taking the highest quantity when a collision is encountered. In even further embodiments where two or more Driver Cases have the same item in inventory, the highest inventory count for the inventory set is selected. The Union Driver case set can then be used to generate the current inventory 2003 for menu and cart.

Figure 22:
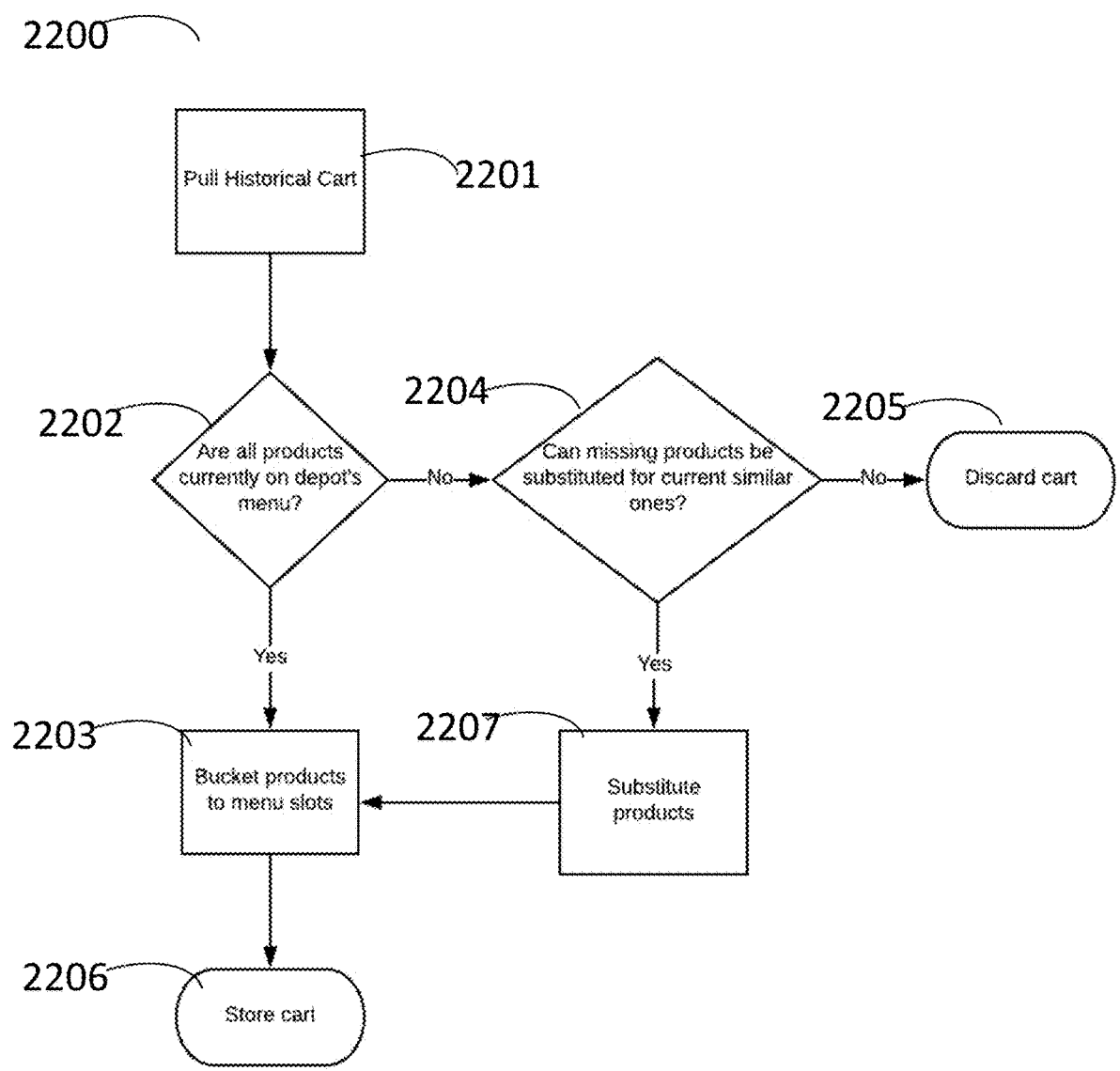
FIG. 22 shows a non-limiting flow chart of historical cart filtering.

Referring to FIG. 22, in a particular embodiment, a historical cart may be loaded and filtered based on the inventory 2200. In this embodiment, when a customer accesses their shopping cart, a historical cart that has been stored may be loaded 2201. In further embodiments, the systems and methods herein then evaluate if all products are currently available on the depot's menu or not 2002. If not, the systems and methods herein examine if the missing products can be substituted with similar products that are available or not 2205. If none of the products can be substituted, the loaded historical cart is discarded 2005. In some embodiments, if one or more products can be substituted 2007, or all the products in the historical cart are available, the products are added to the menu slots for the customer 2203, and the updated cart is stored 2206, optionally for display to the customer.

Manifest

In some embodiments, the systems and methods herein are configured to generate a manifest for the regulated produces in the batch delivery model, the dynamic delivery model, or the hybrid delivery mode. In some embodiments, the manifest is in the plurality of the received orders. In some embodiments, the manifest includes a list of the regulated products and information associated with the listed regulated products, such as product name, product quantity, weight, expiration date, value, origin, destination, etc. In some embodiments, a manifest is generated for each order. In some embodiments, a manifest is generated for each vehicle including one or more orders. In some embodiments, the manifest is a physical or an electronic manifest. In some embodiments, the manifest may be modified when one or more orders has been changed, e.g., modified, deleted, or delivered.

Referring to FIG. 5, in a particular embodiment, is a driver's manifest, which includes the driver's information, number of orders, and information of each order therewithin, such as order number, number of items, delivery address, and customer's name.

Figure 31:
FIG. 31 shows a non-limiting example of a QR code affixed to a product to be delivered.

In some embodiments, each regulated and/or unregulated product can be equipped with means for tracking and tracing its respective location. In some embodiments, such tracking and tracing means can include a label associated with a product. In some embodiments, a label can be affixed to a product and/or product packaging, such as using a sticker or other adhesive means. In some embodiments, a label can be printed onto a product and/or product packaging. In some embodiments, a label can be in the form of a QR code. In some embodiments, a label can be in the form of a barcode. In some embodiments, a label can be in the form of text, figure, or any other form. In some embodiments, a label provides information regarding the corresponding product, and/or provides a means for tracking said product. FIG. 31 provides a non-limiting example of a QR code affixed to a given product, wherein a non-limiting example of label size dimensions are also indicated. In some embodiments, the label can be sized in any size such that the text can be read and/or a QR code and/or barcode can be scanned by a device. In some embodiments, the font size used for the text on the label can be different sizes (e.g., 6 pt, 8 pt, 9 pt, 10 pt, 12 pt, etc.). In some embodiments, the font type of the text on the label can be any font type (e.g. Verdana). In some embodiments, the text on the label can be bolded, italicized, underlined. In some embodiments, a label can be scanned for product and location information (e.g., a QR code, barcode). In some embodiments, a product can be scanned using a mobile device, a handheld scanner, a camera, etc. In some embodiments, such as in a batch process, a depot and/or dispensary staff can scan products prior to packing products for delivery. In some embodiments, a driver, dispensary and/or depot staff member can scan products before the product is placed in an exit bag and sent for delivery. In some embodiments, such as in dynamic delivery, a driver can scan products when they are delivered.

In some embodiments, a graphical user interface (GUI) can be used with a device to scan a label. In some embodiments, the GUI can be configured to automatically upload the product identification and location information to a designated electronic location, such as a specific server. In some embodiments, a GUI can be configured to store the scanned label information, and update a database relating to a retailer's inventory, and/or product tracking information. In some embodiments, the scanned label information can be uploaded and transmitted electronically to a regulatory agency, for e.g., in compliance with regulatory requirements relating to reporting the sale of a regulated product. In some embodiments, a regulatory agency may employ a system to receive such scanned label information. In some embodiments, an example of such a system is the METRC system, as used by the State of California. In some embodiments, a GUI can be configured to be integrated with a regulatory agency system wherein scanned label information can be automatically uploaded and transmitted to the regulatory agency system. In some embodiments, the uploaded and transmitted information can include a license number of a retail partner, the time and date of a sale, corresponding product identification (such as an ID assigned to a specific product by a regulatory agency), quantity of product, unit of measure, and price of the product. In some embodiments, product labelling, such as using a QR code and/or barcode enables a retailer to record and track the respective inventory of a given product. In some embodiments, changes to an inventory can be automatically transmitted to a regulatory agency, such as due to sales, shrinkage or spoilage of product, as identified via scanning said products.

Checkout Errors and Menu Breadth

In some embodiments, the systems and methods herein advantageously operate with less than 10%, 8%, 6%, 5%, 4%, 3%, 2%, or 1% checkout errors for the received orders with the hybrid delivery model. In some embodiments, especially in a dynamic delivery model where there are no drivers that can deliver an order's specific combination of items, a checkout error is generated.

By way of example, a case limit such as the $3 k case limit introduced in the California regulations significantly impacts the ability to leverage dynamic delivery. For comparison, prior to Jan. 1, 2018, up to $15 k of inventory in each driver's case could have been packed, which provides the driver with greater flexibility in carrying a variety of inventory and customers with similarly greater flexibility in making their orders from a large variety of combinations of products. The new case limit has led to a drastic decrease in providing a fewer number of combinations of products to the driver's vehicle, which in turn drastically reduced the options available to customers. As a result, this can lead to an increase in checkout errors (e.g., situations where a potential customer selects a variety of regulated products to purchase with the expectation that these products are available, but upon checkout the potential customer receives an error page telling him that those products are unavailable because there are no drivers that can deliver the potential customer's specifically ordered combination of items). The systems and methods herein advantageously combine the advantages of batch delivery model and dynamic delivery model, and optionally allow a driver and/or a vehicle to switch between the two models thereby significantly reducing the checkout errors comparing with using the dynamic delivery model alone.

In some embodiments, the checkout error is significantly reduced using the hybrid delivery model than the traditional delivery model(s). In some embodiments, the checkout error is reduced by 20%, 30%, 40%, 50%, 60%, 70%, 80% or even more.

Alternatively or in combination with the reduced checkout error, the average order value is significantly increased using the hybrid delivery model as compared to the traditional delivery model(s). In some embodiments, the average order values are increased by 1%, 2%, 3%, 4%, 5%, 6%, 8%, 10%, or even more.

Alternatively or in combination with the reduced checkout error, the average ETA is significantly improved using the hybrid delivery model as compared to the traditional delivery model(s). In some embodiments, the ETA is improved by 1%, 5%, 10%, 15% or even more.

Figure 29:
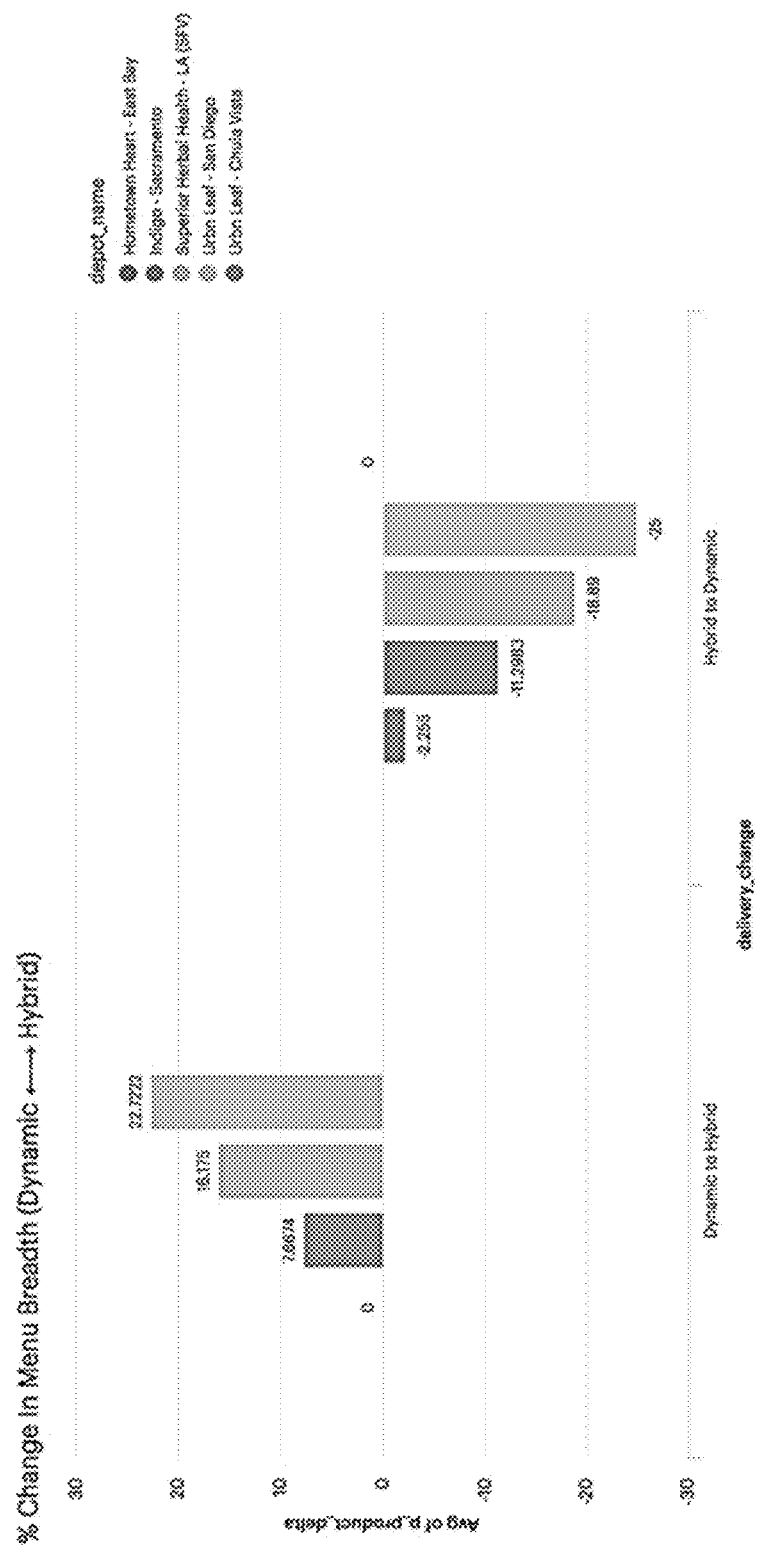
FIG. 29 shows a non-limiting example of menu breadth changes by using hybrid model in comparison to using dynamic model alone.

Alternatively or in combination with the reduced checkout error, the menu breadth (e.g., number of available items for selection) is significantly increased using the hybrid delivery model as compared to dynamic model alone. Referring to FIG. 29, in a particular embodiment, the percentage of increase in menu breadth in different areas or different delivery territories when the delivery model is switched from dynamic only to hybrid was significant. Similarly, when the delivery model switches back to dynamic only, similar reduction in the percentage of menu breadth can been seen. In some embodiments, the menu breadth is significantly increased by switching depots from dynamic only to hybrid. Within a single day, a greater than 5%, 10%, 15%, 20%, 25%, or 30% increase in menu breadth can be obtained. With the inverse switch from hybrid to dynamic model only, a similar drop in menu breadth can be found.

Inventory Case

In some embodiments, the systems or methods herein include an inventory case. In some embodiments, the "inventory case" is equivalent herein to "case" or a "driver's case." In some embodiments, the case herein is an actual locked case carried in the delivery vehicle or by the driver. In some embodiments, the case herein is one or more packages carried in the delivery vehicle or by the driver. In some embodiments, each delivery vehicle herein includes an inventory case that each vehicle can carry for batch, dynamic, and/or hybrid delivery model. In some embodiments, the case disclosed herein includes only regulated products, a combination of regulated and unregulated products, or only unregulated products.

In some embodiments, a content of the inventory case is determined based at least on a predicted demand, the upper regulated inventory case value threshold.

In some embodiments, the upper inventory case value threshold is less than $30,000 $15,000, $10,000, less than $5,000, or less than $3,000. In some embodiments, the upper value threshold for individual order is less than $5,000, $4,000, $3,000, $2,000, $1000, or even less. In some embodiments, the upper inventory case value threshold is for regulated products, unregulated products, or a combination thereof.

In some embodiments, the case inventory of a vehicle, optionally for a given time period (e.g., a day, any single time point of a day, a week, etc.), is determined by a machine learning algorithm. In some embodiments, the case inventory of a vehicle is based on the demand of the consumers, optionally in a specific delivery territory. In some embodiments the demand, optionally in a delivery territory and/or for a given period of time, is predicted by a machine learning algorithm. In some embodiments, the demand is based on a respective depot level demand.

In some embodiments, a specified amount of product inventory and/or specified amount of case inventory can be required to be held at any batch or hybrid depot. In some embodiments, a dispensary having any batch or hybrid depots, will reserve the specified amount of product inventory and/or specified amount of case inventory for such depots. In some embodiments, the specified amount of product inventory and/or specified amount of case inventory reserved for a given depot may be at least one day of supply for each product in the assortment, wherein said amount can be based on the estimated product demand at the given depot. In some embodiments, the specified amount of product inventory and/or specified amount of case inventory can be based on at least a half day of supply for each product in the assortment. As such, in these embodiments, all batch and hybrid depot inventory cases are filled with the minimum required supply of case inventory and/or product inventory in the assortment.

In some embodiments, the number of cases for the delivery models disclosed herein can be any integer that is no less than one. In some embodiments, the number of cases for dynamic delivery model is one. In some embodiments, the number of cases for dynamic delivery is greater than one. In some embodiments, the number of cases for hybrid delivery model is one. In some embodiments, the number of cases for hybrid delivery is greater than one.

Inventory Case Packing Algorithms

In some embodiments, the disclosure herein includes a mobile inventory case packing systems and methods for approximating the optimal combinatorial solution to include in the mobile inventory case while operating under varying compliance guidelines. In some embodiments, the optimal packing combination is for one or more delivery vehicle. In particular, the varying local restrictions on case retail limits can make the case packing problem difficult as it imposes a hard ceiling on the number and/or physical volume of regulated products a driver can carry. The challenges are further compounded when the regulations—including the ones that impose a hard ceiling on the number and/or physical volume of regulated products—are constantly evolving. Hence, a technological tool that can quickly adapt to solve these problems is needed. A delivery model can work best when the right inventory is close to users as they place orders, so it is this ceiling that necessitates finding an optimal solution.

In some embodiments, the systems and methods herein include a data collection/transformation stage and a highly parallelized generation/simulation stage. In some embodiments, the systems and methods include a database of regulated and unregulated products, the regulated products subject to an upper regulated inventory case value. In some embodiments, the systems and methods include a software module receiving the upper regulated inventory case value, a base case allotment, and a number of cases. In some embodiments, the systems and methods include a software module conducting a data collection stage and the parallelized simulation stage.

In some embodiments, during the data collection stage, the systems and methods build a set of training data which is later used to test configurations. This training data can comprise historical orders (attempted and fulfilled) that have been transformed to account for the menu changing overtime. During this stage, the systems and methods also can find order volume distributions (e.g., hourly, daily) and recent driver shifts. With these three components, the simulation can test cases against demand and service levels that represent a typical day.

In some embodiments, the simulation stage itself can be broken into two smaller sub-stages: a case generation stage and a case testing stage.

In some embodiments, the base case is a set of products that is shared across all configurations and is set as a percentage of a case's retail limit. If cases are drawn as a Venn diagram, the base case is analogous to the overlapping section. In the extreme of a single case configuration, the base case allotment is 100%. In further embodiments, the case generation algorithm can be parameterized such that the user can specify the retail limit, the base case allotment, the number of cases, and the delivery type the case can fulfill. Although these parameters can be used as inputs, both the number of cases and base case allotment can be determined through machine learning processes.

One distinction can be how cases for dynamic and hybrid are treated differently. Because there may be no depot case to fall back on in dynamic, it can be important that all products from the ideal assortment be placed into cases. The size of the assortment and the local retail limit may determine how many cases are required for the configuration. In some embodiments, a hybrid case does not have the same restriction on serving the whole assortment because lower turn products can be served by batch deliveries. In both the dynamic and hybrid case, for instances, upper and lower case quantity bounds are established for products based on their demand. In some embodiments, product demand is based at the depot level. Higher demand products can have higher relative bounds, and lower demand products may have lower relative bounds. In some embodiments, these bounds are determined through a heuristic, machine learning processes, or base on empirical data.

In some embodiments, one or more data components are needed for generating cases. In some embodiments, the one or more data components are generated in the data collection stage. In some embodiments, a first data component can be ranked list of all products in the assortment. In some embodiments, this ranking can use data regarding the suitability of the product to be in the base case. In some embodiments, the rank is determined analytically using one or more of: the percentage a product contributes to the depot's revenue, the probability it can end up in a customer's cart, and the average size of order it ends up in. In some embodiments, the ranked list is determined by a machine-learned ranking algorithm.

In some embodiments, the ranked list of products is generated based on one or more of: demand of products, the percentage a product contributes to revenue, the probability the product is added to a customer's cart, and an average size of order in which the product appears.

In some embodiments, a second data component can be an affinity matrix. In some embodiments, the affinity matrix includes a matrix of weights which represents how likely a product is to end up in a cart with another product. In some embodiments, for generating N case configurations (where N>1), the affinity information can help to determine which case to place a given product in.

Figure 21:
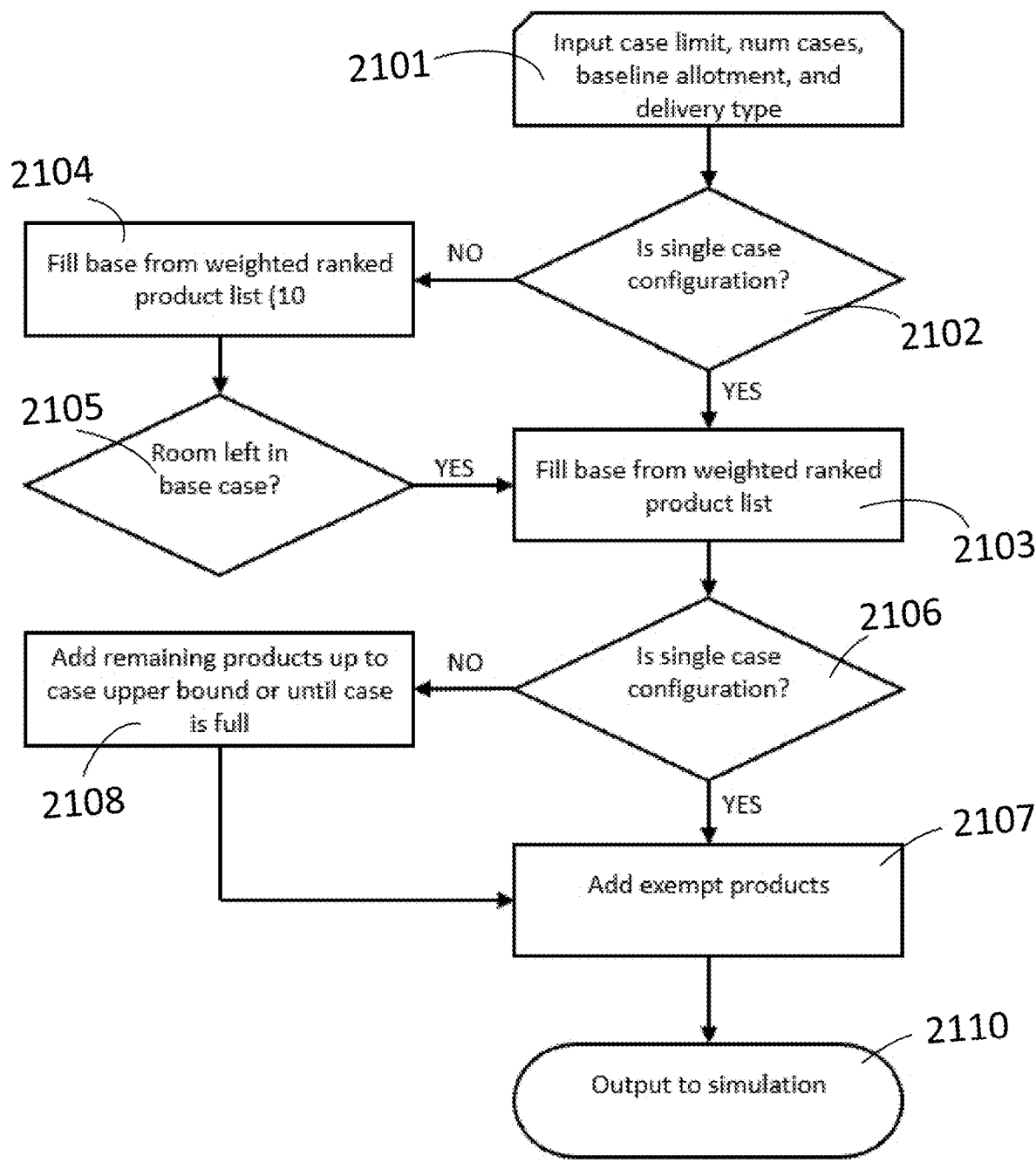
FIG. 21 shows a non-limiting flow chart of a case generation algorithm which generates cases from which an optimized case configuration can be determined by simulating ordering processes using the generated cases.

FIG. 21 shows a non-limiting flowchart for case generation 2100 for hybrid delivery model, dynamic delivery model, or both. In this particular embodiment, the process 2100 starts with the user inputting values for one or more parameters including but not limited to case limit, number of cases in the configuration, the base case allotment, and/or the delivery type 2101. If the delivery model is not hybrid or if the number of cases is more than one 2102, the algorithm first fills the base case up to either the base case allotment or up to the lower bound of each product using the products from the ranked list 2104. In some embodiments, the ranked list is traversed in sequence. The highest demand product is filled to its lower bound first before moving to the second highest demand product. If there is still room left over in the base case 2105, the algorithm then pulls random products from the ranked list with weighting applied to the rank (e.g., the highest ranked product has the highest probability to be added) 2103. In some embodiments, the algorithm pulls random products based on their exponentially weighted rank and fills each base case until a total case quantity is at the upper bound or until the base case is full. In some embodiments, the weighting may be manually or automatically determined. In some embodiments, the weighting is exponential. If the number of cases is more than one 2106, with the base case filled, the remainder of the assortment can be added to the cases. The algorithm can pull random products based on their exponentially weighted rank and fill each case 2108 until a total case quantity is at the upper bound or until the case is full. Afterwards, exempt products (e.g., MAUCRSA exempt products) are added 2107 to the lower bound since they may not contribute to a cases' retail limit. In an alternate embodiment, a first pass can be done by randomly selecting a remaining product based on the exponentially weighted rank and adding it to a random case until the total case quantity is at the lower bound. In this alternate embodiment, once the total case quantity is at the lower bound, a second pass can be taken to fill out the remainder of the cases, wherein for the second pass, the products can still be selected randomly, but on this pass, they are placed based on the affinity matrix. In some embodiments, filling the remainder of the assortment, using any aforementioned method, can be used to seed various configurations and to avoid generating the same inventory case for multiple times. This process 2100 may be repeated for multiple times for generating a predetermined number of cases to output to simulation of the delivery model(s) 2110.

Single case generation can be simpler and may follow a subset of the multiple case generation process in FIG. 21. As shown in FIG. 21, it starts the same as that in the multiple case model, with user defined inputs 2101, but skips directly to filling the base case from the exponentially weighted ranked list 2103. Because the base case allotment can be 100% for hybrid cases, this step can fill out the whole case configuration. The next step is to add exempt products to the lower bound 2107. For both dynamic and hybrid case generation, exit conditions optionally exist to ensure cases never exceed the specified retail limit.

In some embodiments, for both dynamic and hybrid case generation, the number of cases can be one or any integer greater than one.

With the cases generated, finding the best case(s) can come down to, in some embodiments, running the case configurations through numerous simulations and evaluating their relative performance. In some embodiments, the solution space can be extremely large (e.g., there are ~$10^{200}$ possible configurations for three $3K cases and a 200 product assortment), so the testing infrastructure may need to be setup to minimize the search time. In some embodiments, this is accomplished with two sliding scales: the number of case configurations and the number of tests run on a configuration. The process can start with a large number of configurations (e.g., $10^{100}$) and smaller number of tests (e.g., 10,000). After the first set of tests, a number (e.g., in the range of about top 1% to about top 20%) of cases can be kept and the remaining discarded. In some embodiments, the number of cases kept can be configurable manually or automatically by a computer program. The top remaining case configurations can then run through a larger number of tests, keeping a number of top ranking case configurations among them (e.g., again in the range of top 1% to 20% of the top remaining case configurations) and discarding the rest. In some embodiments, this process is repeated until a stopping criteria may be met, e.g., the ideal case is found, a pre-set search time has passed, etc. In some embodiments, the number of cases kept can be configurable manually or automatically by a computer program.

In some embodiments, the mobile inventory case packing application for a dynamic and/or hybrid delivery model comprises a database including regulated products and/or unregulated products. In some embodiments, the mobile inventory case packing application includes a software module for receiving the upper regulated inventory case value, a base case allotment, and/or a number of cases (the number can be one (e.g., for hybrid) or more than one (for dynamic)), for conducting a data collection stage by performing one or more of the following: building a set of training data comprising historical demand and orders; generating a ranked list of products based on demand; determining an upper case quantity bound and a lower case quantity bound for each product based on demand; and if the number of cases is greater than one, generating an affinity matrix comprising a set of weights representing relationships between products. In some embodiments, the mobile inventory case packing application herein includes a software module conducting a parallelized simulation stage by performing at least the following: generating one or more simulated cases based on the number of cases and the base case allotment by: if the number of cases is more than one, for each case, filling a base case up to either the base case allotment or up to the lower bound of each regulated product by sequentially traversing the ranked list, and if room is left in the base case, selecting random regulated products from the ranked list with exponential weighting applied to the rank; if the number of cases is one, filling the base case up to either the base case allotment or up to the lower bound of each regulated product by sequentially traversing the ranked list, and if room is left in the base case, selecting random regulated products from the ranked list with exponential weighting applied to the rank to fill the base case; and for each case, until a total case quantity is at the upper bound: if the number of cases is one, randomly selecting an unregulated product and adding it to the case; if the number of cases is more than one, randomly selecting based on exponentially weighted rank a remaining regulated product and adding it to a random case; and second, selecting an unregulated product and adding it to a random case; running a plurality of parallel simulations based on the set of training data; and evaluating a performance of each simulated case. In some embodiments, randomly selecting a remaining regulated product and adding it to a case based on the affinity matrix may be performed prior to selecting an unregulated product when the number of cases is more than one.

In some embodiments, after cases are generated using the algorithm, and the top performing case or cases is returned (i.e. identified), inventory can be allocated for products associated with one or more promotions. In some embodiments, promotions refer to daily deals and/or discounts that are associated with one or more products. In some embodiments, promotions can refer to specific products that are discounted on a given day. In some embodiments, the algorithm can determine the respective inventory at a corresponding dispensary, and identify parameters that were specified for placing such products with promotions in the identified top performing case or cases. In some embodiments, one of each product having a promotion is included in all cases to ensure breadth. In some embodiments, the algorithm provides case-packing recommendations to allocate depth to the products having promotions anticipated to have the greatest demand. In some embodiments, allocating depth refers to the number of units of a specific product that is assigned to a specific case. In some embodiments, the algorithm identifies high-selling products (e.g., products with a high demand) that can be associated with requiring greater depth. In some embodiments, if there is room left in the case, the top-ranked products having excess supply will be used to fill the case to the upper bound.

In some embodiments, to improve driver efficiency and/or allow for more accurate ETA estimation, the systems and methods herein is configured to optimize how orders are batched (e.g., grouped together and given to a driver to deliver). In some embodiments, optimization of how orders are batched advantageously enables the systems and methods to better meet customer expectations for delivery time.

In some embodiments, to determine a batch, one or more of the following steps are performed (although not necessarily in the order disclosed herein and may be in different orders): 1) calculate a batch size (n); 2) set a configurable window (w) that can vary the batch size by such that the batch size can be any number from n−w to n+w; 3) determine an anchor order, (where an anchor order is the order that the other orders are grouped around and for the given anchor order, a grouping of orders of n+w surrounding the anchor can be selected); 4) optimize the batch size in the window (n−w to n+w) based on tightness of grouping. For example, for better order groupings, the batch size can be bigger, while for more dispersed groupings, the batch size is smaller.

In some embodiments, the Batch Size (s) is determined based on Driver Supply (d) and Order Count (o). In some embodiments, matching of enough orders to drivers can be done by doing the calculation s=o/d. An adjustable constant or gain (g) can be tuned to increase or decrease the batch size based on feedback from the system (e.g., if orders creation is outstripping the ability to deliver them). Taking this into account, the batch size can be calculated as s=g*o/d. In some embodiments, Driver Supply is determined as drivers that are currently available or will be available in a given time frame (which is configurable). In some embodiments, Order Count is the count of current orders plus the estimated number of orders that will be placed in a given timeframe (which is configurable).

In some embodiments, the Batch Size Window is configurable and can be used to find the Maximum Batch Size and Minimum Batch Size. For example, if the Calculated Batch Size is 5 and the Batch Size Window is 2 then there can be a Minimum Batch Size of 3 and a Maximum Batch Size of 7. A driver can be sent out with an Order Count in the range (inclusive) of 3 to 7.

In some embodiments, orders are prioritized based on customers expected delivery time. Orders that are lower probability to meet expectation are given a higher priority. In further embodiments, an Anchor Order is the current order with the highest delivery priority. In such embodiments, the Anchor Order can be determined by doing the following calculation for each order and selecting the highest normalized_eta:

$$remaining\_eta = original\_eta\_time - time\_now$$

$$normalized\_eta = 1 - remaining\_eta/original\_eta,$$

where original_eta_time is the time when we estimated completion of the delivery at the order creation, and time_now is the current time.

In some embodiments, the closest order to the anchor order is selected by distance. In some embodiments, the closest order to the anchor order can be selected using drive time instead of distance. By selecting the closest order not in the Grouping yet, orders can be added to the Grouping until the Maximum Batch Size is reached. In some embodiments, the closest order is defined by the proximity to any order in the batch/grouping but not just the anchor order. In some embodiments, the precedence of the Grouping is maintained so that the first order in the Grouping is the Anchor Order and the last order is the one which was added last to the Grouping based on the closest distance, for example.

In some embodiments, for the Grouping starting at the index (i) of i=Minimum Batch Size+1, increment of i can be iterated comparing the median Distance (d) of the last 3 orders in the Grouping (i−1 i−3). The Distance of the current order i can be divided by the median of the last 3 orders to get the distance_added_ratio:

$$distance\_added\_ratio = d_i/\mathrm{median}(d_{i-3}, d_{i-2}, d_{i-1})$$

In some embodiments, the distance_added_ratio can be compared to a configurable Optimization Constant. If distance_added_ratio is greater than the Optimization Constant, any orders from the Grouping of having an index greater than or equal to i can be removed. In some embodiments, the parameters or variables that are configurable herein can be either configured manually or automatically using a computer.

The systems and methods described herein may use machine learning algorithms for training prediction models and/or making predictions. Machine learning algorithms herein may learn from and make predictions on data. Data may be any input, intermediate output, previous outputs, or training information, or otherwise any information provided to or by the algorithms.

In some embodiments, a machine learning algorithm may use a supervised learning approach. In supervised learning, the algorithm can optionally generate a function or model from training data. In some embodiments, the training data can be labeled. In some embodiments, the training data may include metadata associated therewith. Each training example of the training data may optionally be a pair consisting of at least an input object and a desired output value. A supervised learning algorithm may in some embodiments require the user to determine one or more control parameters. These parameters can optionally be adjusted by optimizing performance on a subset, for example a validation set, of the training data. After parameter adjustment and learning, the performance of the resulting function/model can optionally be measured on a test set that may be separate from the training set. In further embodiments, regression methods can be used in supervised learning approaches.

In other embodiments, a machine learning algorithm may use an unsupervised learning approach. In unsupervised learning, the algorithm may optionally generate a function/model to describe hidden structures from unlabeled data (e.g., a classification or categorization that cannot be directed observed or computed). Because, in some embodiments, the examples given to the learner are unlabeled, there is no evaluation of the accuracy of the structure that is output by the relevant algorithm. Approaches to unsupervised learning include, but are not limited to: clustering, anomaly detection, and neural networks.

In further embodiments, a machine learning algorithm may use a semi-supervised learning approach. Semi-supervised learning can combine both labeled and unlabeled data to generate an appropriate function or classifier.

In other embodiments, a machine learning algorithm may use a reinforcement learning approach. In reinforcement learning, the algorithm can learn a policy of how to act given an observation of the world. Every action may have some impact in the environment, and the environment can provide feedback that guides the learning algorithm.

In some embodiments, a machine learning algorithm may use a transduction approach. Transduction can be similar to supervised learning, but does not explicitly construct a function. Instead, the algorithm tries to predict new outputs based on training inputs, training outputs, and new inputs.

In some embodiments, a machine learning algorithm may use a "learning to learn" approach. In learning to learn, the algorithm can learn its own inductive bias based on previous experience.

In some embodiments, a machine learning algorithm is applied to order data to generate a prediction model. In some embodiments, a machine learning algorithm or model may be trained periodically. In some embodiments, a machine learning algorithm or model may be trained non-periodically.

As used herein, a machine learning algorithm may optionally include learning a function or a model. In some embodiments, the mathematical expression of the function or model may or may not be directly computable or observable. The function or model may optionally include one or more parameter(s) used within a model. For example, a linear regression model having a formula Y=C0+C1x1+C2x2 has two predictor variables, x1 and x2, and coefficients or parameter, C0, C1, and C2. The predicted variable in this example is Y. After the parameters of the model are learned, values can be entered for each predictor variable in a model to generate a result for the dependent or predicted variable (e.g., Y).

Figure 30:
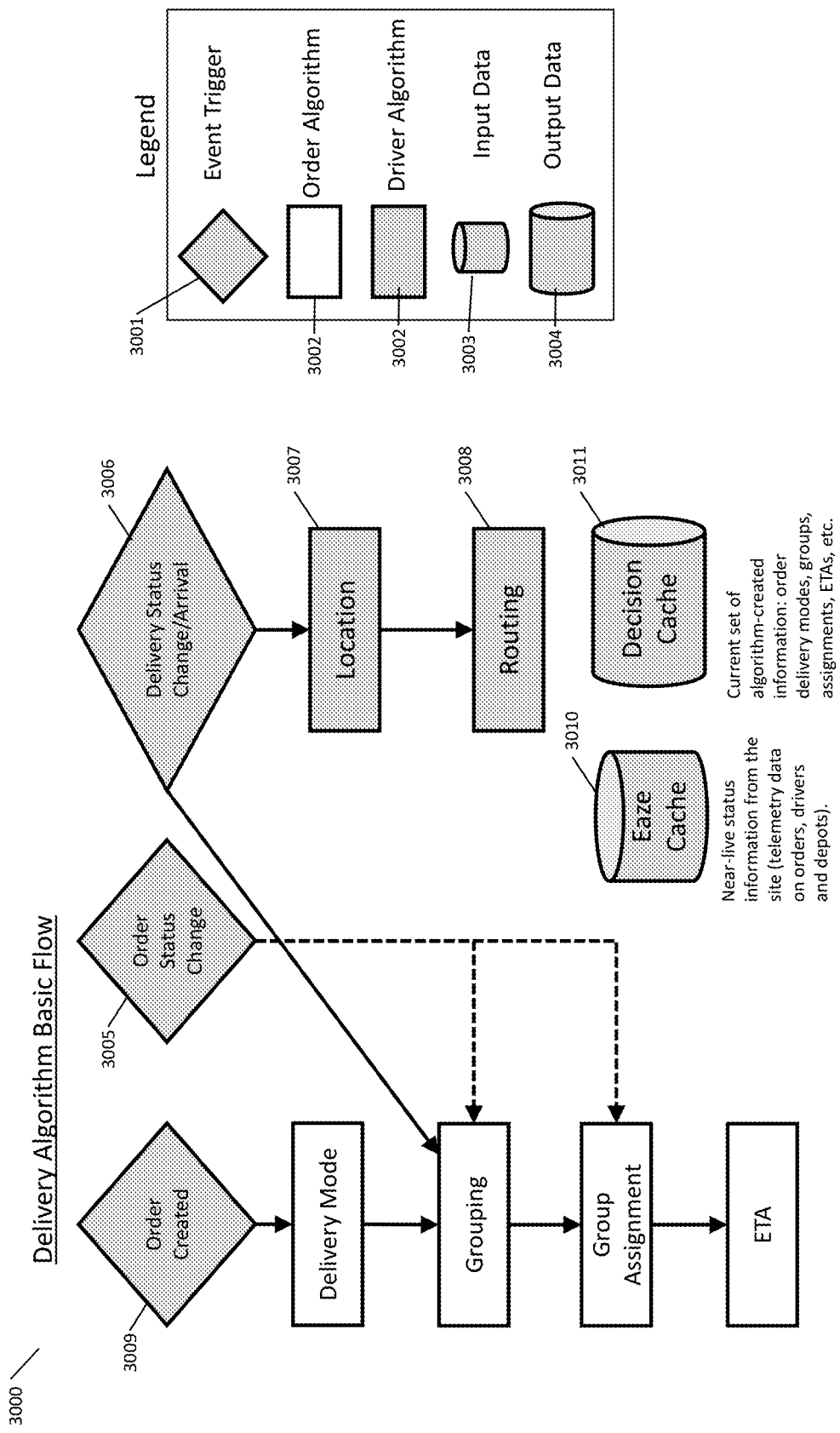
FIG. 30 shows a non-limiting depiction of a delivery system and associated components for delivering regulated and unregulated products.

In some embodiments, the applications herein are part of a delivery system that includes all aspects for systems and methods for the delivery of regulated and/or unregulated products. In some embodiments, the delivery system can comprise of one or more delivery algorithms that are subsets of the delivery system. FIG. 30 shows a non-limiting example of a delivery system comprising a plurality of delivery algorithms 3002, event triggers 3001, input data 3003, and output data 3004 for the delivery of regulated and/or unregulated products. In some embodiments, the delivery system 3000 can include several application interfaces configured to send and receive data. In some embodiments, such application interfaces can include graphical user interfaces (GUI) as displayed on user devices, which can include mobile devices, computing devices, etc. In some embodiments, input data can initiate an event trigger, which will initiate one or more delivery algorithms to execute an action, and output data relating to said action. For example, in one embodiment, an input data 3010 may relate to a driver location, for example GPS coordinates relayed from a device, associated with a driver, to a server associated with the delivery system 3000 (e.g., received via telemetry). In some embodiments, said driver location may result in a driver event trigger 3006, such as identifying that the driver has arrived at a particular location. In this exemplary embodiment, the driver event trigger will result in in one or more driver algorithms being initiated, such as driver location 3007 or routing 3008, such that the next location and routing information for the driver will be determined by the system and relayed to the driver device as output data.

In some embodiments, examples of an event trigger can include a user at a customer checkout page on a graphical user interface, an order event, a driver event, a depot event, and so on. In some embodiments, an order event can include an order created by a user 3009, and/or an order status change 3005, which can include an order cancelled, an order delivered, an order packed (e.g., for a batch model), an order dispatched (e.g., for a batch model), an order ejected from queue (e.g., for a batch model), and so on. In some embodiments, a driver event can include a status change 3006, such as a driver indicating they are 1) accepting delivery orders; 2) not accepting delivery orders; and/or 3) temporarily holding off from accepting delivery orders. In some embodiments, a driver event can include a driver arriving 3006 at a location, such as a delivery location or a depot. In some embodiments, a driver event can include a case change. In some embodiments, a depot event can include 1) a depot that comes online or goes offline; 2) a change to a manual parameter, such as a particular regulation for a regulated good (e.g. upper inventory case value), and/or 3) a change to a depot case.

In some embodiments, an event trigger can initiate a particular delivery algorithm to execute an action. For example, in some embodiments, a driver event may trigger a driver algorithm to estimate the location of a driver 3007, and/or determine a driver's next destination and route that they will take to get there 3008. In some embodiments, a driver event may trigger a driver algorithm to re-assign the delivery mode of a driver (e.g. from dynamic mode to batch mode, or vice versa). In some embodiments, an event trigger can initiate a particular order algorithm to execute an action. For example, in some embodiments, an order event may trigger an order algorithm to 1) determine a delivery mode, such as batch or dynamic; 2) assign a delivery sequence to one or more groups of orders that may or may not have been assigned to a driver; 3) assign a group of orders to a specific driver and specify a delivery sequence; and/or 4) estimate the arrival time of an order or potential order.

In some embodiments, event triggers, delivery algorithms, and output data can be based on input data received. In some embodiments, such input data can be stored in a computing cache 3010 or other computing storage means (as described below). In some embodiments, computing cache 3010 can be a cache of data from the various application interfaces relating to the delivery system 3000, such as data collected from users, drivers, and depots. In some embodiments, input data can be collected and/or received in the system automatically and/or manually. In some embodiments, input data can be based on order checkout information, which can include 1) delivery location for an order, 2) products that are in a cart for checkout on a GUI, and/or 3)

the particular user accessing the order checkout interface. In some embodiments, input data can be based on information relating to orders received, which can include 1) delivery location of an order, 2) products in a cart for an order that was placed, 3) order status, and/or 4) the particular user that made the order. In some embodiments, input data can be based on information relating to drivers, which can include 1) the one or more cases accompanying the driver, 2) driver location, 3) driver status, and/or 4) delivery mode assigned to the driver. In some embodiments, input data can be based on information relating to depots, which can include 1) the one or more cases located at the depot, 2) depot location, 3) depot operating hours, and 4) manually-tunable parameters relating to the depot (such as upper inventory case value of a regulated product). In some embodiments, input data can be based on information relating to shift plans, which can include shift plans for a depot and/or driver, and include respective start and end times, and/or opening and closing hours (e.g., for a depot).

In some embodiments, output data can provide information and can also serve as input data, for example providing input to one or more delivery algorithms. In some embodiments, output data can represent machine-created information for the delivery algorithms, such as setting group orders, planned driver routes, etc. In some embodiments, output data can be outputted to a GUI device associated with a user, depot, dispensary, driver, customer, etc. In some embodiments, output data can be outputted automatically and/or manually. In some embodiments, output data can include information relating to orders, such as a delivery mode (batch or dynamic), and/or estimate time of arrival for an order. In some embodiments, output data can include information relating to drivers, such as deliveries included with a driver queue/manifest, and/or the next destination and route for the driver. In some embodiments, output data can include information relating to packing and printing instructions for products, such as during batch mode.

In some embodiments, the delivery system can be in the form of an application programming interface (API). In some embodiments, the delivery system can be outputted onto a GUI. In some embodiments, the delivery system can configure one or more delivery algorithms to return results within a certain time frame, such as less than a specified number of seconds. In some embodiments, the delivery system, from an API standpoint, can be configured to automatically scale as the volume of usage varies. In some embodiments, the delivery system can be configured to minimize cost by minimizing external API calls for only as necessary to achieve precise results (e.g., using an external navigation tool to identify the fastest route for a driver to reach a destination). In some embodiments, the delivery system can be configured to minimize driving distance and time.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, handheld computers, Internet appliances, mobile smartphones, and tablet computers. Those of skill in the art will recognize that many smartphones are suitable for use in the system described herein.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input.

Figure 26:
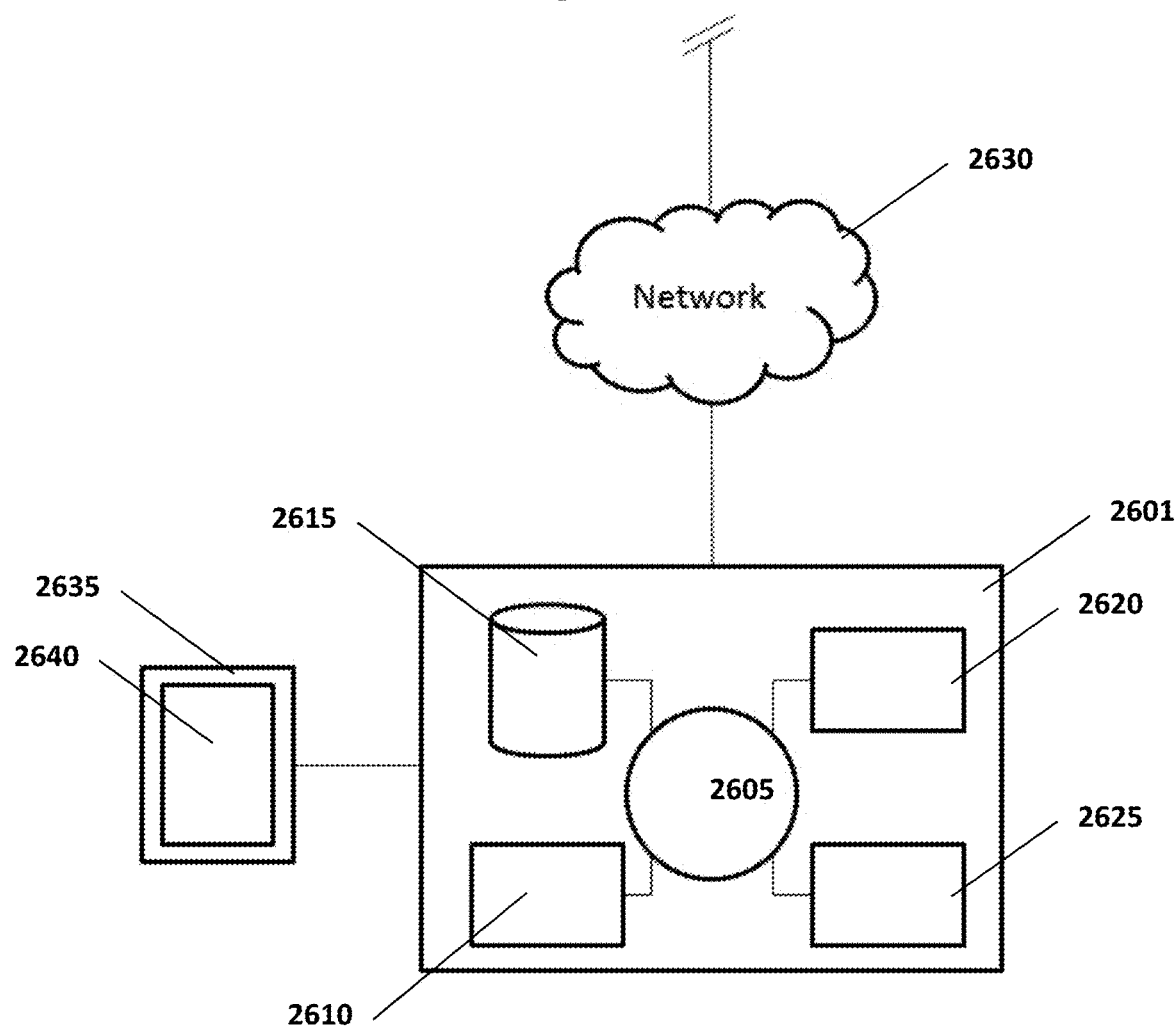
FIG. 26 shows a non-limiting schematic diagram of a digital processing device; in this case, a device with one or more CPUs, a memory, a communication interface, and a display.

Referring to FIG. 26, in a particular embodiment, an exemplary digital processing device 2601 is programmed or otherwise configured to create and run a hybrid delivery model application and/or case packing application for regulated and/or products. The device 2601 can regulate various aspects of the applications of the present disclosure. In this embodiment, the digital processing device 2601 includes a central processing unit (CPU, also "processor" and "computer processor" herein) 2605, which can be a single core or multi core processor, or a plurality of processors for parallel processing. The digital processing device 2601 also includes memory or memory location 2610 (e.g., random-access memory, read-only memory, flash memory), electronic storage unit 2615 (e.g., hard disk), communication interface 2620 (e.g., network adapter) for communicating with one or more other systems, and peripheral devices 2625, such as cache, other memory, data storage and/or electronic display adapters. The memory 2610, storage unit 2615, interface 2620 and peripheral devices 2625 are in communication with the CPU 2605 through a communication bus (solid lines), such as a motherboard. The storage unit 2615 can be a data storage unit (or data repository) for storing data. The digital processing device 2601 can be operatively coupled to a computer network ("network") 2630 with the aid of the communication interface 2620. The network 2630 can be the Internet, an internet and/or extranet, or an intranet and/or extranet that is in communication with the Internet. The network 2630 in some cases is a telecommunication and/or data network. The network 2630 can include one or more computer servers, which can enable distributed computing, such as cloud computing. The network 2630, in some cases with the aid of the device 2601, can implement a peer-to-peer network, which may enable devices coupled to the device 2601 to behave as a client or a server.

Continuing to refer to FIG. 26, the CPU 2605 can execute a sequence of machine-readable instructions, which can be embodied in a program or software. The instructions may be stored in a memory location, such as the memory 2610. The instructions can be directed to the CPU 2605, which can subsequently program or otherwise configure the CPU 2605 to implement methods of the present disclosure. Examples of operations performed by the CPU 2605 can include fetch, decode, execute, and write back. The CPU 2605 can be part of a circuit, such as an integrated circuit. One or more other components of the device 2601 can be included in the circuit. In some cases, the circuit is an application specific integrated circuit (ASIC) or a field programmable gate array (FPGA).

Continuing to refer to FIG. 26, the storage unit 2615 can store files, such as drivers, libraries and saved programs. The storage unit 2615 can store user data, e.g., user preferences and user programs. The digital processing device 2601 in some cases can include one or more additional data storage units that are external, such as located on a remote server that is in communication through an intranet or the Internet.

Continuing to refer to FIG. 26, the digital processing device 2601 can communicate with one or more remote computer systems through the network 2630. For instance, the device 2601 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 2601, such as, for example, on the memory 2610 or electronic storage unit 2615. The machine executable or machine readable code can be provided in the form of software. During use, the code can be executed by the processor 2605. In some cases, the code can be retrieved from the storage unit 2615 and stored on the memory 2610 for ready access by the processor 2605. In some situations, the electronic storage unit 2615 can be precluded, and machine-executable instructions are stored on memory 2610.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 27:
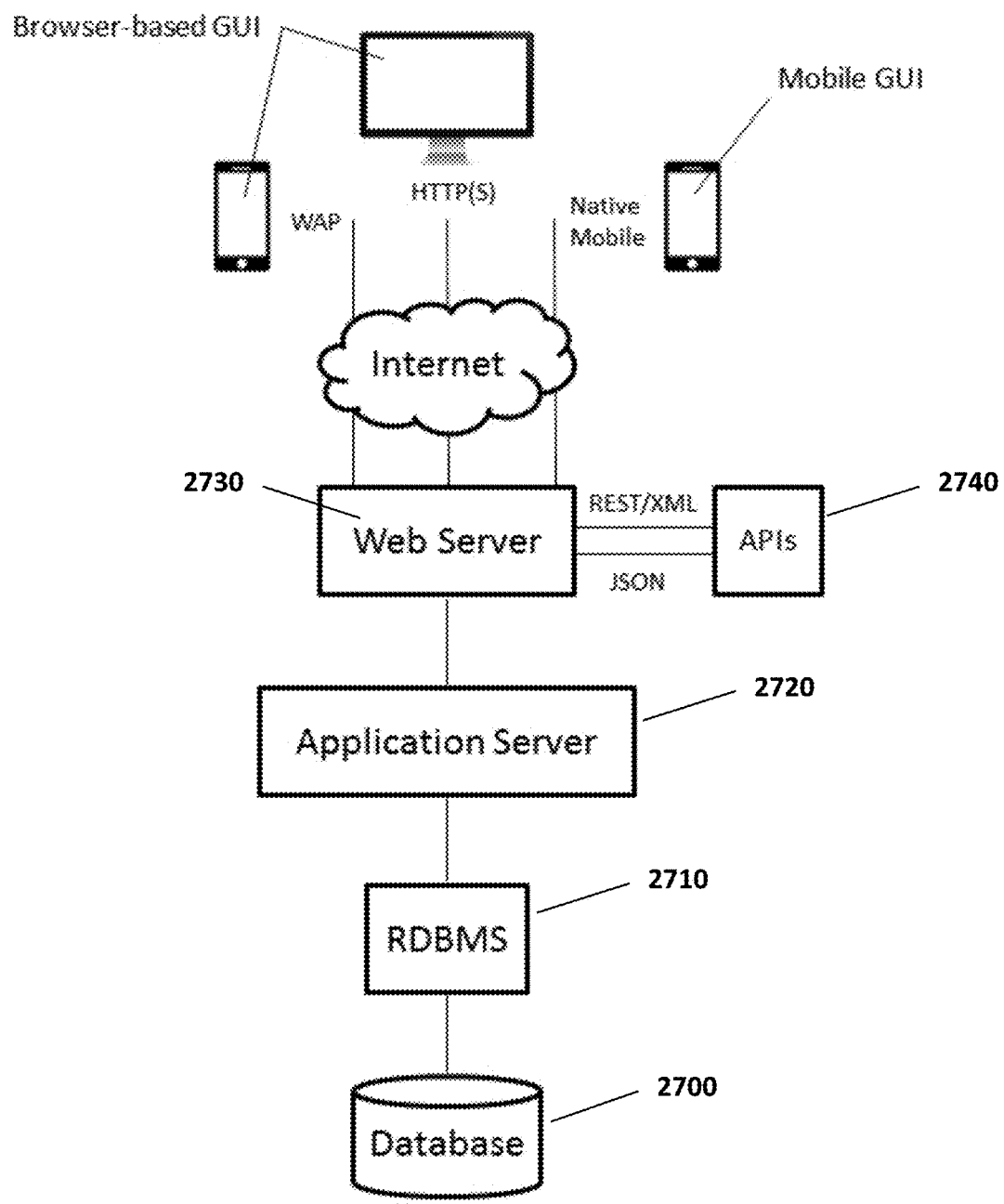
FIG. 27 shows a non-limiting schematic diagram of a web/mobile application provision system; in this case, a system providing browser-based and/or native mobile user interfaces.

Referring to FIG. 27, in a particular embodiment, an application provision system comprises one or more databases 2700 accessed by a relational database management system (RDBMS) 2710. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 2720 (such as Java servers, .NET servers, PHP servers, and the like) and one or more web servers 2730 (such as Apache, IIS, GWS and the like). The web server(s) optionally expose one or more web services via app application programming interfaces (APIs) 2740. Via a network, such as the Internet, the system provides browser-based and/or mobile native user interfaces.

Figure 28:
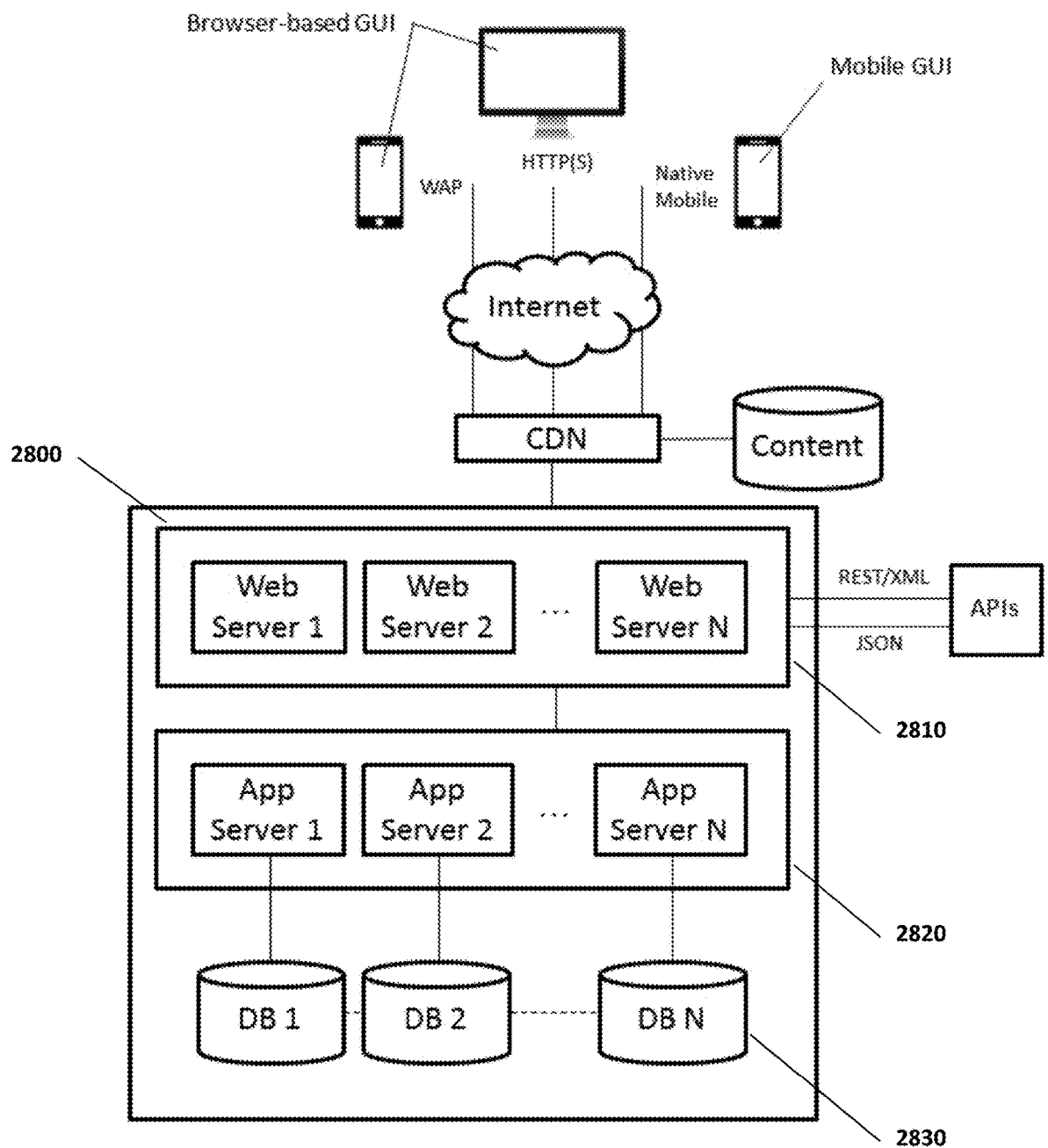
FIG. 28 shows a non-limiting schematic diagram of a cloud-based web/mobile application provision system; in this case, a system comprising an elastically load balanced, auto-scaling web server and application server resources as well synchronously replicated databases.

Referring to FIG. 28, in a particular embodiment, an application provision system alternatively has a distributed, cloud-based architecture 2800 and comprises elastically load balanced, auto-scaling web server resources 2810 and application server resources 2820 as well synchronously replicated databases 2830.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of information associated with the systems and methods herein.

In some embodiments, the database herein includes one or more of: at least one delivery territory; at least one product depot; a plurality of regulated products; and a plurality of delivery vehicles. In some embodiments, each vehicle in the database includes a regulated product inventory case which can be updated with a predetermined schedule, e.g., daily, every 12 hours, etc. In some embodiment, the database one or more an upper inventory case value threshold imposed on one or more of the regulated products by regulation(s) for at least one delivery territory. In some embodiments, the database includes a delivery model for each delivery vehicle, the delivery model being a batch delivery model, a dynamic delivery model, and optionally a model that can switch between batch and dynamic delivery models.

In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

What is claimed is:

1. A computer-implemented system comprising: a digital processing device comprising: at least one processor, an operating system configured to perform executable instructions, a memory, and a computer program including instructions executable by the at least one processor to create a hybrid delivery model application for regulated products comprising:
    a) a database comprising: at least one delivery territory; a plurality of regulated products; and a plurality of delivery vehicles, each vehicle comprising a regulated product inventory case; the regulated products subject to regulation imposing an upper regulated inventory case value threshold; and each vehicle configured to operate in either of a dynamic delivery model and a batch delivery model and optionally switch between models;
    b) setting the delivery model for each vehicle and optionally switching the delivery model for one or more of the vehicles;
    c) receiving orders for delivery of one or more of the regulated products within the at least one delivery territory;
    d) providing the dynamic delivery model, wherein a content of the inventory case is determined based at least on a predicted demand and the upper regulated inventory case value threshold, and wherein one or more of the received orders are assigned, based at least on routing efficiency comprising distance and estimated delivery time, as they are received to one or more vehicles operating in the dynamic delivery model; and
    e) providing the batch delivery model, wherein a content of the inventory case is determined based at least on a plurality of the received orders and the upper regulated inventory case value threshold, and wherein the plurality of the received orders are batched, based at least on routing efficiency comprising distance and estimated delivery time, and assigned to a vehicle operating in the batch delivery model.

2. The system of claim 1, wherein the dynamic delivery model is favored and applied if possible based on the content of the inventory cases of the vehicles operating in the dynamic delivery model.

3. The system of claim 1, wherein, in the batch delivery model, the application generates a manifest for the regulated products in the plurality of the received orders.

4. The system of claim 1, wherein the database further comprises a plurality of unregulated products and wherein the content of the inventory case comprises one or more of the unregulated products, one or more of the regulated products, or a combination thereof.

5. The system of claim 1, wherein the application further comprises setting the delivery model for the at least one delivery territory, at least one depot, or both, wherein the at least one depot is for storing products to be delivered.

6. The system of claim 1, wherein the case inventory is determined by a machine learning algorithm.

7. The system of claim 1, wherein the demand is predicted by a machine learning algorithm.

8. The system of claim 1, wherein providing the batch delivery model is configured to determine at least one batch for a batch driver comprising:
    a) calculating a batch size based on one or more of: a number of available drivers, proximity of an available driver to a depot, location of orders, and a count of orders;
    b) determining a maximum or minimum batch size;
    c) determining an anchor order with high delivery priority; and
    d) grouping one or more orders with the anchor order.

9. The system of claim 8, wherein each of the one or more orders are grouped based on a distance between a delivery address of that order to the delivery address of the batch order, delivery time from the delivery address of that order to the delivery address of the batch order, or both.

10. A computer-implemented method of delivering regulated products via a hybrid delivery model system comprising:
    a) maintaining, in a non-transitory storage, a database comprising: at least one delivery territory; a plurality of regulated products; and a plurality of delivery vehicles, each vehicle comprising a regulated product inventory case; the regulated products subject to regulation imposing an upper regulated inventory case value threshold; and each vehicle configured to operate in either of a dynamic delivery model and a batch delivery model and optionally switch between models;
    b) setting, by a computer, the delivery model for each vehicle and optionally switching the delivery model for one or more of the vehicles;
    c) receiving, by the computer, orders for delivery of one or more of the regulated products within the at least one delivery territory;
    d) providing, by the computer, the dynamic delivery model, wherein a content of the inventory case is determined based at least on a predicted demand and the upper regulated inventory case value threshold, and wherein one or more of the received orders are assigned, based at least on routing efficiency comprising distance and estimated delivery time, as they are received to one or more vehicles operating in the dynamic delivery model; and
    e) providing, by the computer, the batch delivery model, wherein a content of the inventory case is determined based at least on a plurality of the received orders and the upper regulated inventory case value threshold, and wherein the plurality of the received orders are batched, based at least on routing efficiency comprising distance and estimated delivery time, and assigned to a vehicle operating in the batch delivery model.

11. The method of claim 10, wherein the dynamic delivery model is favored and applied if possible based on the content of the inventory cases of the vehicles operating in the dynamic delivery model.

12. The method of claim 10 further comprising switching, by the computer, the delivery model of one or more of the vehicles automatically.

13. The method of claim 10, further comprising configuring, by the computer, the upper regulated inventory case value threshold and/or the upper total inventory case value threshold automatically.

14. The method of claim 10, wherein, in the batch delivery model, a manifest is generated for the regulated products in the plurality of the received orders.

15. The method of claim 10, wherein the database further comprises a plurality of unregulated products and wherein the content of the inventory case comprises one or more of the unregulated products, one or more of the regulated products, or a combination thereof.

16. The method of claim 10, further comprising setting, by the computer, the delivery model for the at least one delivery territory, at least one depot, or both, wherein the at least one depot is for storing products to be delivered.

17. The method of claim 10, wherein the case inventory is determined by a machine learning algorithm.

18. The method of claim 10, wherein the demand is predicted by a machine learning algorithm.

19. The method of claim 10, wherein providing the batch delivery model comprises determining at least one batch for a batch driver comprising:
   a) calculating a batch size based on one or more of: a number of available drivers, proximity of an available driver to a depot, location of orders, and a count of orders;
   b) determining a maximum or minimum batch size;
   c) determining an anchor order with high delivery priority; and
   d) grouping one or more orders with the anchor order.

20. The method of claim 19, wherein each of the one or more orders are grouped based on a distance between a delivery address of that order to a delivery address of the batch order, a delivery time from the delivery address of that order to the delivery address of the batch order, or both.

21. A computer-implemented system comprising: a digital processing device comprising: at least one processor, an operating system configured to perform executable instructions, a memory, and a computer program including instructions executable by the at least one processor to create mobile inventory case packing application for a dynamic or hybrid delivery model, the application comprising:
   a) a database of regulated and unregulated products, the regulated products subject to an upper regulated inventory case value;
   b) receiving the upper regulated inventory case value, a base case allotment, and a number of cases;
   c) conducting a data collection stage by performing at least the following:
      i) building a set of training data comprising historical demand and orders;
      ii) generating a ranked list of products based on demand;
      iii) determining an upper case quantity bound and a lower case quantity bound for each product based on demand; and
   d) conducting a parallelized simulation stage by performing at least the following:
      i) generating one or more simulated cases based on the number of cases and the base case allotment by:
         1) for each case, filling a base case up to either the base case allotment or up to the lower bound of each regulated product by sequentially traversing the ranked list, and if room is left in the base case, selecting random regulated products from the ranked list with exponential weighting applied to the rank; and
         2) for each case, until a total case quantity is at the upper bound, first, randomly selecting a remaining regulated product based on exponential weighting and adding it to a random case; and second, selecting an unregulated product and adding it to a random case;
      ii) running a plurality of parallel simulations based on the set of training data; and
      iii) evaluating a performance of each simulated case.

22. The system of claim 21, wherein:
   a) conducting a data collection stage further performs generating an affinity matrix comprising a set of weights representing relationships between products; and
   b) conducting a parallelized simulation stage further performs, prior to selecting an unregulated product, randomly selecting a remaining regulated product and adding it to a case based on the affinity matrix.

23. The system of claim 21, wherein the number of cases and/or the base case allotment are received from a machine learning process.

24. The system of claim 21, wherein the ranked list of products is determined based on at least the percentage a product contributes to revenue, the probability the product is added to a customer's cart, and an average size of order in which the product appears.

25. The system of claim 21, wherein the ranked list of products and/or the upper and lower case quantity bound for each product is determined by a machine learning process.

26. A computer-implemented system comprising: a digital processing device comprising: at least one processor, an operating system configured to perform executable instructions, a memory, and a computer program including instructions executable by the at least one processor to create mobile inventory case packing application for a dynamic or hybrid delivery model, the application comprising:
   a) a database of regulated and unregulated products, the regulated products subject to an upper regulated inventory case value;
   b) receiving the upper regulated inventory case value and a base case allotment;
   c) conducting a data collection stage by performing at least the following:
      i) building a set of training data comprising historical demand and orders;
      ii) generating a ranked list of products based on demand;
      iii) determining an upper case quantity bound and a lower case quantity bound for each product based on demand; and
   d) conducting a parallelized simulation stage by performing at least the following:
      i) generating a simulated case based on the base case allotment by:
         1) filling a base case up to the base case allotment by sequentially traversing the ranked list, and if room is left in the base case, selecting random regulated products from the ranked list with exponential weighting applied to the rank; and
         2) until a total case quantity is at the lower bound, randomly selecting an unregulated product and adding it to the case;
      ii) running a plurality of parallel simulations based on the set of training data; and
      iii) evaluating a performance of the simulated case.

27. The system of claim 26, wherein the number of cases and/or base case allotment is received from a machine learning process.

28. The system of claim 26, wherein the ranked list of products is determined based on at least the percentage a product contributes to revenue, the probability the product is added to a customer's cart, and an average size of order in which the product appears.

29. The system of claim 26, wherein the ranked list of products is determined by a machine learning process.

30. The system of claim 26, wherein the upper and the lower case quantity bound for each product is determined by a machine learning process.

* * * * *